US008421015B1

(12) United States Patent
Scott et al.

(10) Patent No.: US 8,421,015 B1
(45) Date of Patent: Apr. 16, 2013

(54) POSITION SENSING DETECTOR FOCAL PLANE ARRAY (PSD-FPA) EVENT DETECTION AND CLASSIFICATION SYSTEM

(75) Inventors: Basil H. Scott, Waimea, HI (US); Randy Wolfshagen, Waimea, HI (US); Robert E. Swanson, Princeville, HI (US); Justin Eiler, Waimea, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 1248 days.

(21) Appl. No.: 12/283,708

(22) Filed: Sep. 15, 2008

Related U.S. Application Data

(60) Provisional application No. 60/960,062, filed on Sep. 13, 2007.

(51) Int. Cl.
*G01J 5/20* (2006.01)

(52) U.S. Cl.
USPC ............................................. 250/338.4

(58) Field of Classification Search ............... 250/338.4, 250/330, 332, 353; 356/5.01; 257/432
See application file for complete search history.

(56) References Cited

U.S. PATENT DOCUMENTS

| | | | |
|---|---|---|---|
| 3,699,341 A | 10/1972 | Quillinan et al. | |
| 5,686,889 A | 11/1997 | Hillis | |
| 6,057,915 A | 5/2000 | Squire et al. | |
| 6,249,002 B1* | 6/2001 | Butler | 250/338.4 |
| 6,496,593 B1 | 12/2002 | Krone, Jr. et al. | |
| 7,233,546 B2 | 6/2007 | Berkovich et al. | |
| 7,333,181 B1 | 2/2008 | Scott et al. | |
| 7,409,899 B1 | 8/2008 | Beekman | |
| 7,420,195 B2 | 9/2008 | Cerwin et al. | |
| 8,130,367 B2* | 3/2012 | Stettner et al. | 356/5.01 |
| 2004/0004707 A1* | 1/2004 | DeFlumere | 356/4.01 |
| 2006/0021498 A1 | 2/2006 | Moroz et al. | |

FOREIGN PATENT DOCUMENTS

WO   WO/2007/056753   5/2007

OTHER PUBLICATIONS

Haag, L.C.; *Muzzle Flash! Documenting the demon*; American Handgunner Magazine; Nov.-Dec. 2007.
Pauli et al; *Tactical Situational Awareness of Enemy Gunfire*; 2006 NRL Review; pp. 1-2.
Richards, A.A.; *Applications for High Speed Imaging*; InFramation 2004 Proceedings; 10 pages.

\* cited by examiner

*Primary Examiner* — David Porta
*Assistant Examiner* — Faye Boosalis
(74) *Attorney, Agent, or Firm* — James Creighton Wray

(57) ABSTRACT

An event detection and classification system uses a new type of optical sensing component, a Position Sensing Detector Focal Plane Array (PSD-FPA). The PSD-FPA provides for high-speed operation that allows for accurate sensing of fast artifacts that are unique to weapons fire and enables precise location of optical phenomenon. The system detects and classifies events, particularly weapons fire, and rejects false alarms. An optical lens sub-system focuses light onto a PSD-FPA, which senses the photons and generates electrical signals associated with individual elements of the PSD-FPA. These signals are processed to identify and classify weapons-related or other events. Background subtraction, variable gain, time-intensity and time-location correlation, digital filtering, Fourier analysis, and wavelet analysis are all used to successfully classify the events while rejecting false alarms.

54 Claims, 32 Drawing Sheets

Figure 2
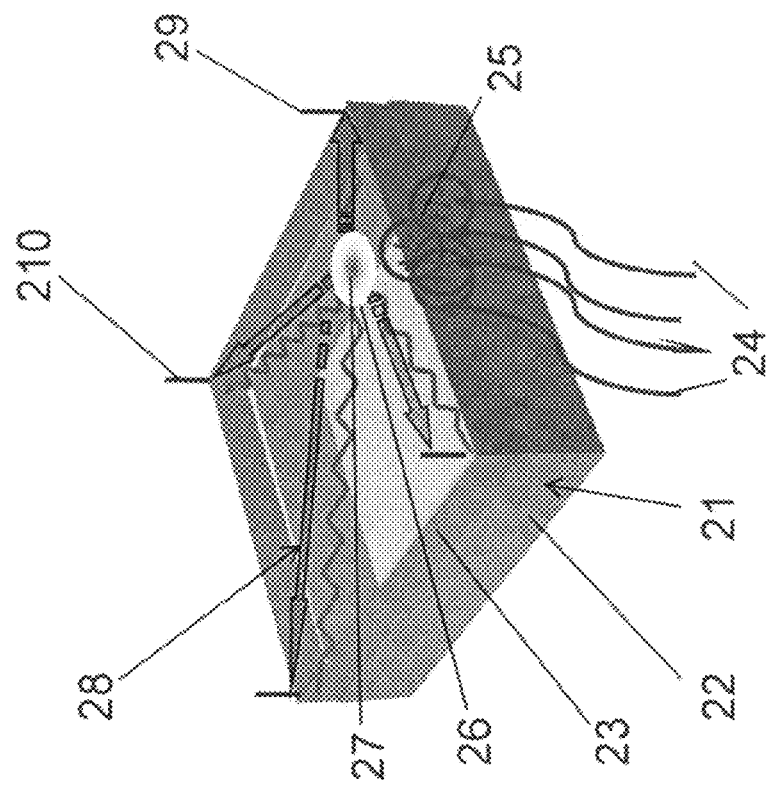
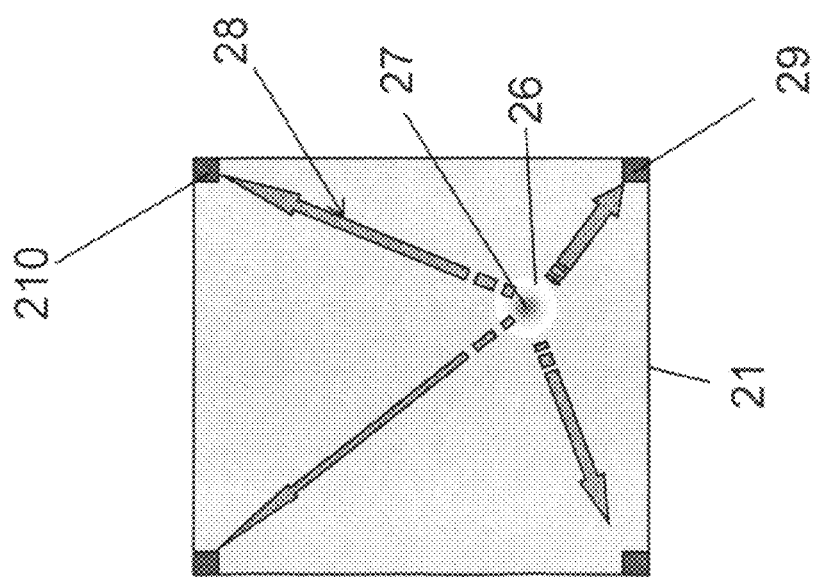

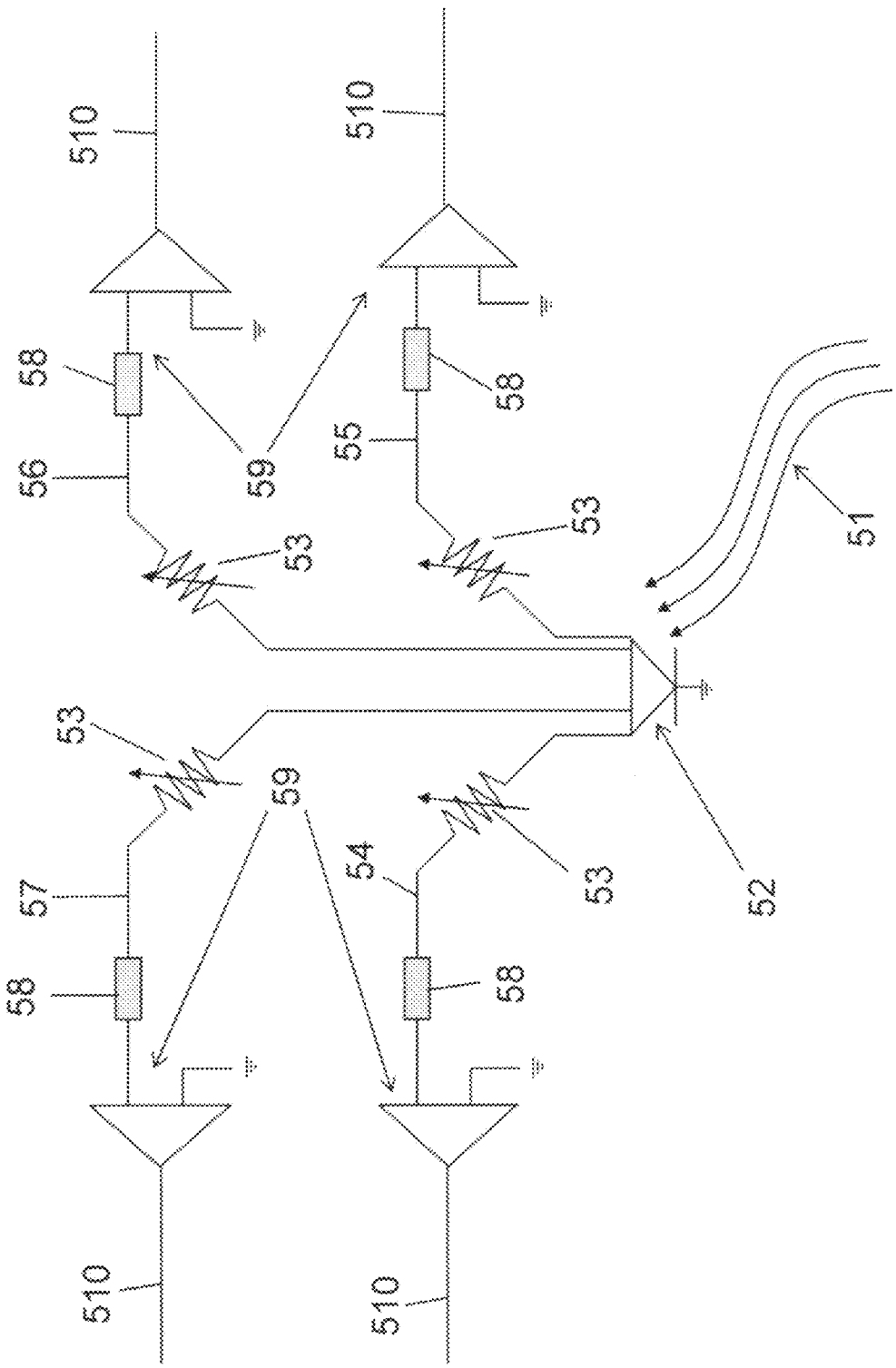

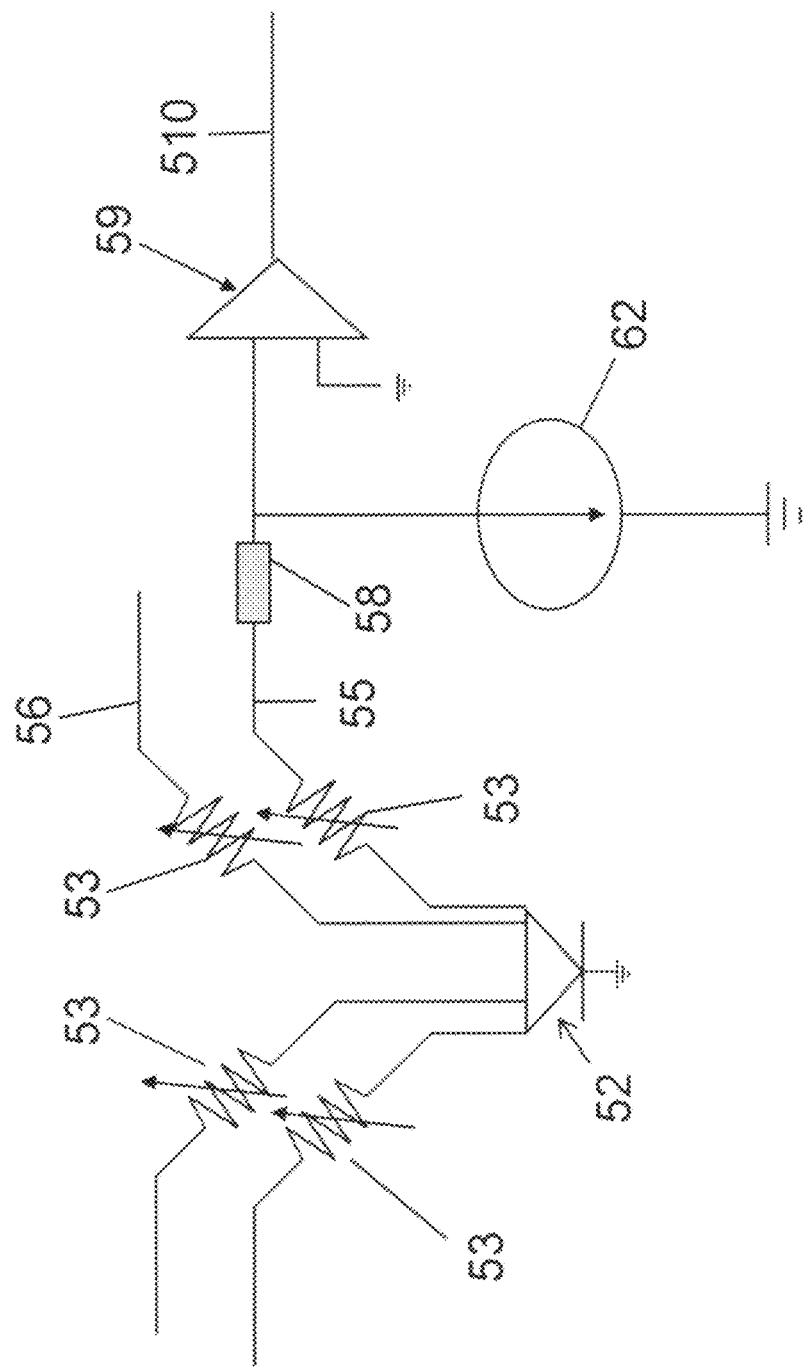

POSITION SENSING DETECTOR FOCAL PLANE ARRAY (PSD-FPA) EVENT DETECTION AND CLASSIFICATION SYSTEM

This application claims the benefit of U.S. Provisional Application No. 60/960,062, filed Sep. 13, 2007, which is hereby incorporated by reference in its entirety.

This invention was made with Government support under Contract No. W15P7T-06-C-M212 awarded by the Department of the Army. The Government has certain rights in this invention.

BACKGROUND OF THE INVENTION

Needs exist for improved optical systems to detect and classify weapons fire and other events. Improvements are required for detection and false alarm rejection, weapon classification, and coverage for the entire area of interest, or battle space.

Previous optically-based event detection systems have utilized imaging focal plane arrays of the same type that are used in camera systems as their optical sensing component. Position sensing detector focal plane arrays (PSD-FPA) have previously been used as the sole sensor element in systems for laser beam control and for passive optical detection and tracking. Previous PSD-FPA based systems operated either with passive or active illumination, but not both.

Needs exist for improved systems and processing methods that take advantage of the characteristics of PSD-FPA to detect and classify a variety of events.

SUMMARY OF THE INVENTION

The present invention addresses the needs of prior systems and extends the limits of existing systems to new operational regimes. The capabilities of the PSD-FPA are utilized in a new system that applies new and powerful processing techniques to detect and classify events of interest. The system and processing methods can be used for any type of event that has a distinctive signature that distinguishes the event from the background. The processing techniques can also be used with other systems and in applications where other types of signals are processed, for example auditory signals, rather than optical signals. One application for which the system and processing methods are particularly well suited is the detection of weapons fire.

Through the use of the PSD-FPA sensor element, the current invention provides for high-speed operation that allows for accurate sensing of fast artifacts that are unique to weapons fire. This enables more accurate weapon detection, weapon classification and more effective false alarm rejection. The PSD-FPA also enables precise location of optical phenomenon that can be used to improve detection and false alarm rejection.

The present invention senses light from the environment to detect weapons (or other optical events), which could be IR, UV visible, or a combination of these. This light may be reflected sunlight or artificial light, or emitted photons, which arise due to the temperature of an object or event that occurs within the environment. This light includes background photons, which originate from the sky, the earth, structures, objects, and naturally occurring events that are not of interest. It also includes light caused by events of interest, including weapons or weapons fire (or other optical events), which is manmade and transitory. The system can detect multiple types of weapons including guns, rockets and rocket propelled grenades, and missiles.

The present invention consists of an optical sensor module and an electronic control module. In the optical sensor module, an optical lens sub-system focuses light onto one or more PSD-FPA(s) and/or imaging focal plane arrays, which generate electronic signals. These signals are digitized and multiplexed by the optical sensor module control and input/output (I/O) component. These digital signals are transmitted to the electronic control module.

In the electronic control module, the signals are received by an I/O interface card and sent to a digital computer, where they are interpreted to detect and characterize events. The computer system also generates control signals which are transmitted back to the optical sensor module. There, they are received and interpreted by the optical sensor module control and I/O component, which generates timing pulses and voltages to control the optical sensor or sensors. For weapons detection, the PSD-FPA sensor element or elements operate at high-speed data rates, for example 9000 to 12,000 frames per second. The high-speed data rate is uniquely enabled by the PSD-FPA. The system uses efficient computational methods, which may be matched to the characteristics of the PSD-FPA, to ensure that the composite data stream from one or more PSD-FPA(s) and/or imaging focal plane arrays can be efficiently processed. These methods enable high-resolution time-domain waveform analysis, frequency-domain analysis, and signal-transform analysis. The combination of these methods is referred to as signature analysis. While the individual methods are well known, they are uniquely combined here to process optical signals.

A new optical event detection system has an optical sensor module and an electronic control module electrically connected to the optical sensor module. The optical sensor module includes an optical lens sub-system comprising a lens, one or more optical sensors including focal plane arrays, which include one or more position sensing detector focal plane arrays (PSD-FPA), and electronics. Each of the one or more PSD-FPA may also include a detector element and a read-out integrated circuit (ROIC). The one or more optical sensors may also include an imaging focal plane array. The one or more PSD-FPA may be more than one PSD-FPA. The electronic control module may also include human and machine interfaces and a computer and software for system control and system interfaces. The system may also include interconnect cabling, and the optical sensor module may also include a control and input/output (I/O) component and the electronic control module may also include an I/O interface. The control and I/O component and I/O interface communicate via the interconnect cabling, and the computer is a signal processing and control computer.

The optical lens sub-system may also include one or more mirrors or light split elements. The detector elements of the one or more PSD-FPA include a number of lateral effect diode elements, each having a sensing surface and four signal sensing connections. Each sensing surface includes a P-N diode structure with a covering of resistive P-layer. Illumination photons interact with the sensing surface to generate charges that move through the resistive layer to the signal sensing connections, which connect to the ROIC using indium bump interconnects.

The ROIC may include a controllable current source prior to an amplifier corresponding to each signal sensing connection. The controllable current source performs background subtraction by removing a portion of the signals generated from the lateral effect diode elements before they reach the corresponding amplifier. The ROIC may also include a comparator located at the output of each amplifier for adjusting the background subtraction by comparison. The comparator may also include an adjustable reference voltage used to establish a controlled uniform background light level, which in turn established controllable contrast levels. The ROIC may also include a variable capacitor across each amplifier controlled by a gain control logic, a sample and hold capacitor that stores the resulting output and is connected dynamically to the amplifier using a sample and hold switch, and an output multiplexer, which allow for variable gain.

The control and I/O component may also include a memory buffer for storing output signals from the ROIC, an electronic data-to-electronic control module interface for sending data to the electronic control module when the memory buffer is full, and a low noise level shifting and voltage generator for generating precision control clocks/voltages for the ROIC. The system may also include data frames organized by the I/O interface of the electronic control module from data received from the optical sensor module and data windows formed from stacks of the data frames. Each data window contains signals from a single element of the one or more PSD-FPA organized in time sequence.

In one embodiment, the optical lens sub-system includes one or more mirrors or light split elements, the control and I/O component includes a memory buffer for storing output signals from the ROIC, an electronic data-to-electronic control module interface for sending data to the electronic control module when the memory buffer is full, and a low noise level shifting and voltage generator for generating precision control clocks/voltages for the ROIC. Stacks of data frames organized by the I/O interface of the electronic control module from data received from the optical sensor module are formed into data windows. Each data window contains signals from a single element of the one or more PSD-FPA organized in time sequence.

In a new optical event detection and classification method, an optical sensor module is provided that includes one or more position sensing detector focal plane arrays (PSD-FPA), which each include a detector and a read out integrated circuit (ROIC), an optical lens sub-system that includes one or more lenses, and a control and input/output (I/O) component. An electronic control module is provided and light is focused onto the one or more PSD-FPA with the optical lens sub-system. Photons are sensed and electrical currents are generated with the detector. The electrical currents are amplified and sampled with the ROIC. The amplified and sampled electrical currents are transmitted to the control and I/O component. The amplified and sampled electrical currents are digitized and multiplexed with the control and I/O component and the digitized and multiplexed electrical currents are transmitted to the electronic control module. The transmitted electrical currents are received in the electronic control module and the received electrical currents are interpreted to detect and characterize events. The one or more PSD-FPA may be more than one PSD-FPA, and the method may include multiple spectral band sensing using the multiple PSD-FPA. The multiple spectral band sensing may be used to detect the temperature of an observed object or event.

The one or more PSD-FPA may include more than one PSD-FPA, and one PSD-FPA may be used for passive sensing and the other for laser illuminated sensing. The electronic control module may include an I/O interface and a computer and receiving the transmitted electrical current in the electronic control module may include receiving the transmitted electrical currents with the I/O interface. In this embodiment, the received electrical currents are sent to the computer and the received electrical currents are interpreted in the computer.

Control signals may be generated with the computer, the control signals may be transmitted back to the optical sensor module via the I/O interface, the control signals may be received with the control and I/O component, and timing pulses and voltages may be generated with the control and I/O component to control the PSD-FPA. The one or more PSD-FPA may be operated at data rates of 9,000 to 12,000 frames per second. When the optical sensor module is provided, the optical lens sub-system may be configured into a desired arrangement including one or more mirrors or light split elements in addition to the one or more lenses. The detector may include an array of lateral effect diode elements, each of which has signal leads that connect to the ROIC. The sensing photons and generating electrical currents with the detector includes generating charges from interaction of photons with the detector material that move through a resistive layer to the signal leads, so that the charges are split between the signal leads according to the resistance encountered, which varies according to the distance between the incident photons giving rise to the charges and each signal lead.

Background subtraction may also be performed on the electrical currents to remove background clutter. To perform the background subtraction separately and independently for each diode element and for each signal lead on the PSD-FPA, each signal lead may be connected to a controllable current source prior to the input of an amplifier in the ROIC and a portion of the electrical current removed from the detector with the controllable current source before it reaches the amplifier. Background calibration may also be performed. The ROIC may include an adjustable comparison reference voltage in a comparator at the output of each amplifier, a compare bit and comparator output switch, and a current source control logic. In this embodiment, to perform the background subtraction background calibration is performed and to perform the background calibration the output voltage of each amplifier is compared with the adjustable comparison reference voltage in the comparator and a compare bit value is sent to the current source control logic that sets the value of the controllable current source. The compare bit output is connected to the control logic by the comparator output switch, which is closed, forming the connection only when background calibration is commanded. Background calibration may be performed at a set frequency, to implement dynamic background subtraction and mitigate signals that change more slowly than the background calibration frequency, or based on observed background changes, to ensure that contrast levels remain within a specified range.

The ROIC may also include a variable capacitor across each amplifier controlled by gain control logic. In this embodiment, the gain control logic is controlled directly with the control and I/O component and indirectly with the electronic control module in order to vary the gain of the electrical currents. A dual-gain, fast switchover tripwire function may be implemented that changes the gain of an individual PSD-FPA diode element from high to low within a single frame read time when the output of the amplifier rises towards a saturation voltage to prevent saturation from extremely bright events.

The ROIC may include an adjustable comparison reference voltage in a comparator at the output of each amplifier, a compare bit and comparator output switch, and a current source control logic, and performing the background subtraction may include performing background calibration in which the output voltage of each amplifier is compared with the adjustable comparison reference voltage in the comparator and a compare bit value is sent to the current source control logic that sets the value of the controllable current source. The compare bit output is connected to the control logic by the comparator output switch, which is closed, forming the connection only when background calibration is commanded, and the dual-gain, fast switchover tripwire function is implemented in which the adjustable comparison reference voltage is set to a tripwire voltage when background calibration is not necessary and the compare bit is sent to the current source control logic, which sets all four ROIC circuits for a single PSD-FPA diode element to a tripwire gain setting depending on the compare bit.

The control and I/O component may include a memory buffer, data-to-electronic control module interface, and low noise level shifting and voltage generator. The amplified and sampled electrical currents are digitized and multiplexed with the control and I/O component, in which analog-to-digital conversion is performed on the amplified and sampled electrical currents and digitized data samples are stored in the memory buffer. The digitized and multiplexed electrical currents are transmitted to the electronic control module, in which digitized data samples in the memory buffer are sent to the electronic control module via the data-to-electronic control module interface using a common electrical format when the memory buffer is full. The timing pulses and voltages are generated with the control and I/O component to control the PSD-FPA, in which received control signals are used to generate timing and commands and the low noise level shifting and voltage generator is used to generate precision control clocks or voltages for the ROIC.

In one embodiment, receiving the transmitted electrical currents with the I/O interface the transmitted electrical currents are organized into rows and frames of data. In the interpreting the received electrical currents carried out in the computer the frames of data are stacked to form data windows, each containing signals from a single PSD-FPA diode element organized in time sequence. In the interpreting the received electrical currents in the computer, two or more data windows are multiply processed simultaneously.

In the interpreting the received electrical currents in the computer, an event detection threshold may be autonomously determined for a data window based on signal variation within that data window and the data window may be discarded if it does not contain a signal rise or pulse that exceeds the event detection threshold. In the interpreting the received electrical currents in the computer data in a data window that was not discarded may be shifted so that the average background value is zero, a zeroed signal formed, the start point of a signal rise or pulse that exceeds the event detection threshold, the maximum point of that signal rise or pulse, and the end point of that rise or pulse, if any, determined, the start point, maximum point, and end point used to determine if the signal rise or pulse is a signal rise or a signal pulse, and signal rises and signal pulses processed separately.

In the processing signal pulses, line fit equations may be calculated for the rising and falling edge of each signal pulse as defined by the start point, maximum point, and end point of the pulse and the ratio of the rising and falling slope of each pulse compared to determine if it falls within the range typical for any of various types of optical events and the error between the lines defined by the line fit equations and the actual data determined. In the processing signal pulses, two non-linear functions may be fit to each signal pulse, parameters of the functions may be determined, the parameters of the functions compared to the parameters typical of various types of optical events, and an error metric calculated for each non-linear function measuring how much the actual data deviates from the curve defined by the fit non-linear function. The non-linear functions may have the form $F(J)=K*J*\exp(1-L*J)$, where J is the time index for the function and is zero for the start point of the signal pulse, and L and K are estimated parameters, and Xj, TRANSFORM=$Ln[Xj/J]$ is the transform function used for $F(J)$, and only the points from the maximum point of a pulse to the end point are used to estimate the $F(J)$ parameters K and L, where L can be used to categorize weapons producing muzzle blasts.

In the processing signal pulses, window data may be digitally filtered and filter responses and ratios may be used as parameters for comparison and testing, Fourier analysis of window data may be conducted and Fourier coefficients and frequency power components and ratios used as parameters for comparison and testing, and wavelet analysis of windows data conducted using function parameters, their ratios, and error metrics as parameters for comparison and testing.

In the processing signal pulses, a time-location correlation analysis may be performed to determine if a real location can be associated with an observed event, in the absence of which the source of the observed event is unlikely to be weapons fire. In performing a time-location correlation analysis, the start and end points of a signal pulse in a data window may be determined and data from all signal leads used to calculate a position for each point in the data window, an average background center point location determined, the distance of each point in the data window from the average background center point location calculated, a minimum location shift threshold determined based on the average background center point location, an average distance deviation determined from the average background center point location, and a standard deviation of this average distance deviation and whether several points in a row break the minimum location shift threshold determined.

In one embodiment, in the processing signal pulses, a time-location correlation analysis may be performed and it may be determined if a signal pulse is weapons-related and if so what class of weapon it is related to, using a weighted decision process that integrates each analysis and test performed. Each test or analysis is assigned a weighting factor that determines its relevance for each weapon type.

In the processing signal pulses, a time-location correlation analysis may be performed and it may be determined if a signal pulse is event-related and if so what class of event it is related to, using a weighted decision process that integrates each analysis and test performed. Each test or analysis is assigned a weighting factor that determines its relevance for each event type.

In the processing signal rises there may be initial fast processing, state information maintained, records of detected signal rises stored, and time and position correlation used to determine when a long duration event or a multi-part event has occurred. In the initial fast processing, line fit equations may be calculated for the signal rise and slope parameters may be compared against typical values for weapons-related events and non-linear function fit to the signal rise.

In the interpreting the received electrical currents in the computer, a rocket propelled grenade may be confirmed by identifying a signal pulse initiation event matching RPG characteristics, followed by a continuous event that changes in intensity or moves in angular location occurring within a set time limit. In the processing signal rises, testing may be conducted to ensure that the pulse initiation event and continuous event occur within the set time limit and are correlated in location. In the processing signal rises, data may be tracked in two dimensions to confirm a missile or rocket by identifying a continuous event that changes in intensity or moves in angular location.

In a new method of signal processing for detecting events of interest, data is received from a sensor with one or more sensor elements, the data is organized into one or more data windows that each contain data from one of the one or more sensor elements organized in time sequence. An average sample-to-sample signal change of the data in one of the one or more data windows is calculated, an event detection threshold for the one data window is autonomously determined based on the average sample-to-sample signal change of the data, and whether the one data window contains a pulse or signal rise that exceeds the event detection threshold is determined. The one data window is discarded if it does not contain a pulse or signal rise that exceeds the event detection threshold, thereby minimizing the amount of signal processing required.

In a new event detection and classification method, one or more sensors are provided, each having one or more sensor elements, sensor data is sensed and generated with the one or more sensors, and the sensor data is processed to identify and categorize events of interest. In the processing the sensor data, background subtraction, time-intensity and time-location correlation, and wavelet analysis are performed.

In the providing one or more sensors, one or more position sensing detector focal plane arrays (PSD-FPA) may be provided. An optical lens sub-system is provided that focuses incoming light on the PSD-FPA. In the sensing and generating sensor data with the one or more sensors, photons may be sensed and electrical signals generated with the PSD-FPA. In the processing the sensor data to identify and categorize events of interest the electrical signals may be processed to identify and categorize optical events of interest. In the processing the sensor data Fourier analysis may be performed.

In the processing the sensor data the sensor data may be organized into one or more data windows that each contain data from one of the one or more sensor elements organized in time sequence and an average sample-to-sample signal change of the data in one of the one or more data windows may be calculated. An event detection threshold is autonomously determined for the one data window based on the average sample-to-sample signal change of the data and it is determined whether the one data window contains a pulse or signal rise that exceeds the event detection threshold. The one data window is discarded if it does not contain a pulse or signal rise that exceeds the event detection threshold, thereby minimizing the amount of signal processing required.

BRIEF DESCRIPTION OF THE DRAWINGS

FIG. 2 is a perspective and overhead drawing showing the structure of the PSD-FPA elements.

FIG. 5B is a diagram showing how the PSD-FPA detector element connects to the ROIC.

FIG. 6 is a diagram of a background subtraction implementation.

DETAILED DESCRIPTION OF THE DRAWINGS

This invention uses a new type of focal plane array, the Position Sensing Detector Focal Plane Array (PSD-FPA). In this invention, one or more PSD-FPA(s) may be used as the optical sensor element, or one or more PSD-FPA(s) may be used in combination with imaging focal plane arrays. In this invention, combined active and passive illumination is described. In addition, this invention extends prior PSD-FPA based system operation for detection and tracking to include combined tracking with location of a stationary event, and classification of the type of event that occurred.

Figure 1:
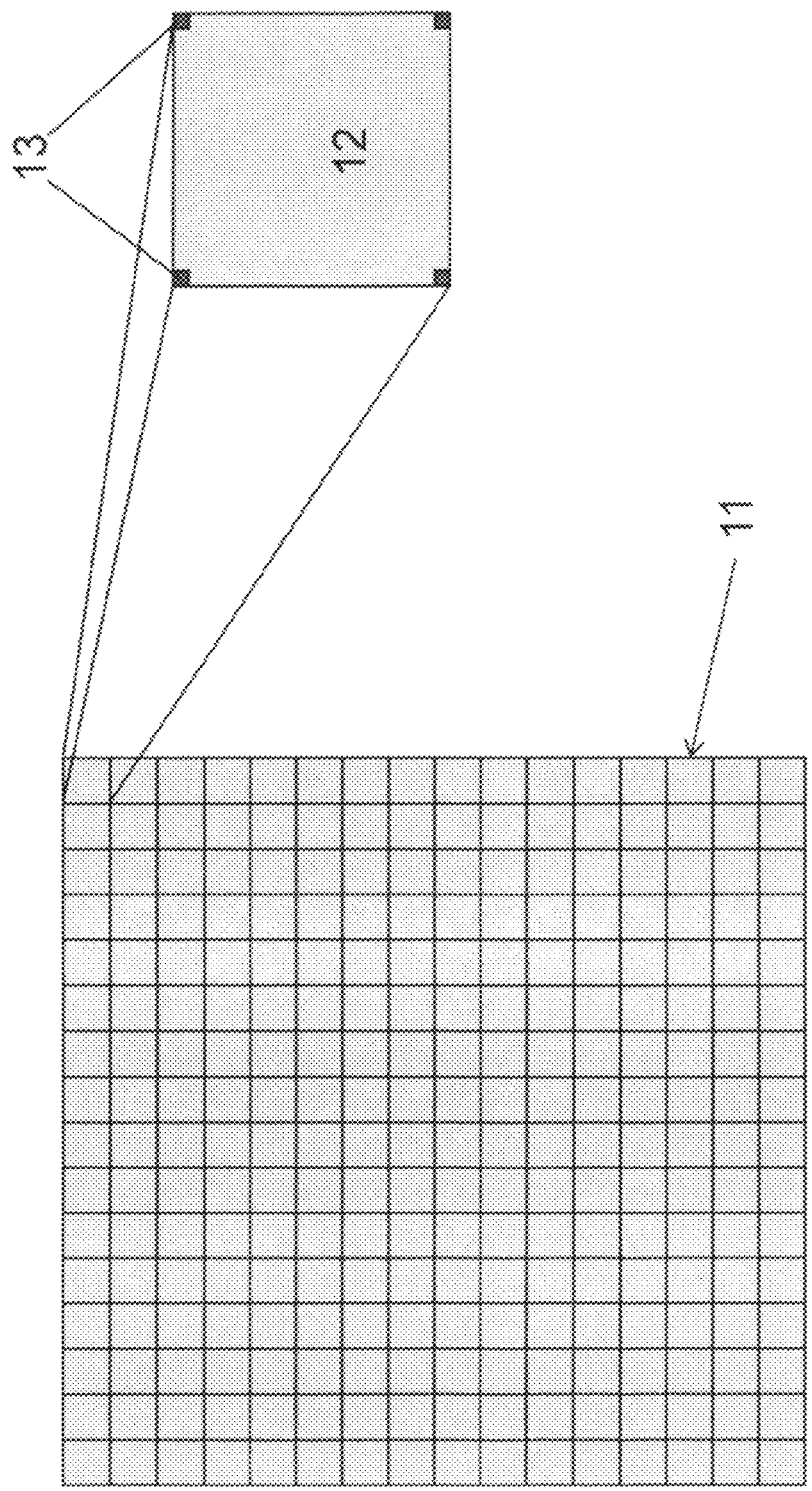
FIG. 1 is a diagram illustrating an exemplar 16×16 PSD-FPA and one of the elements on the array.

FIG. 1 illustrates an exemplar 16×16 PSD-FPA 11 and one of the elements on the array 12. The PSD-FPA can be any size or shape, but for hostile fire detection, it is typically square and typically consists of 256 to 4096 elements. Each element 12 consists of a sensing surface and four signal sensing connections 13 as indicated.

FIG. 2 shows how these elements are constructed as lateral effect diodes. The PSD-FPA element 21, is depicted in a two-dimensional overhead and a three-dimensional perspective view. PSD-FPA element 21 consists of a normal P-N diode structure 22, which is modified with the addition of a resistive P-layer 23. Illumination photons 24 interact with the detector material to generate charges 25, which move through the resistive layer 23.

Charges 25 form across the entire area of illumination, shown here as an illumination spot 26; however due to the behavior of the resistive layer, these can be modeled as coming from the centroid of the illumination spot 27. Charge migration 28 through the resistive layer to signal leads is determined by the location of the spot 26 and its centroid 27. More charges 25 will move toward close signal leads 29 than more distant signal leads 210. This phenomenon occurs because the charges 25 encounter less resistance along the path to the close signal lead 29.

By comparing the signals from the four signal leads 12, 29, 210, it is possible to determine the location of the optical centroid with greater accuracy than is possible when using imaging focal plane arrays. For example, the PSD-FPA can sense optical centriod position shifts of less than a micron and can determine absolute position to within 4 microns. Also, the PSD-FPA can be operated at higher speeds, for example 10,000 frames per second, while in full frame mode than imaging focal planes can. Both the high-speed operation and the high accuracy operation are advantages for high-speed optical event sensing, including weapons fire sensing.

Figure 3:
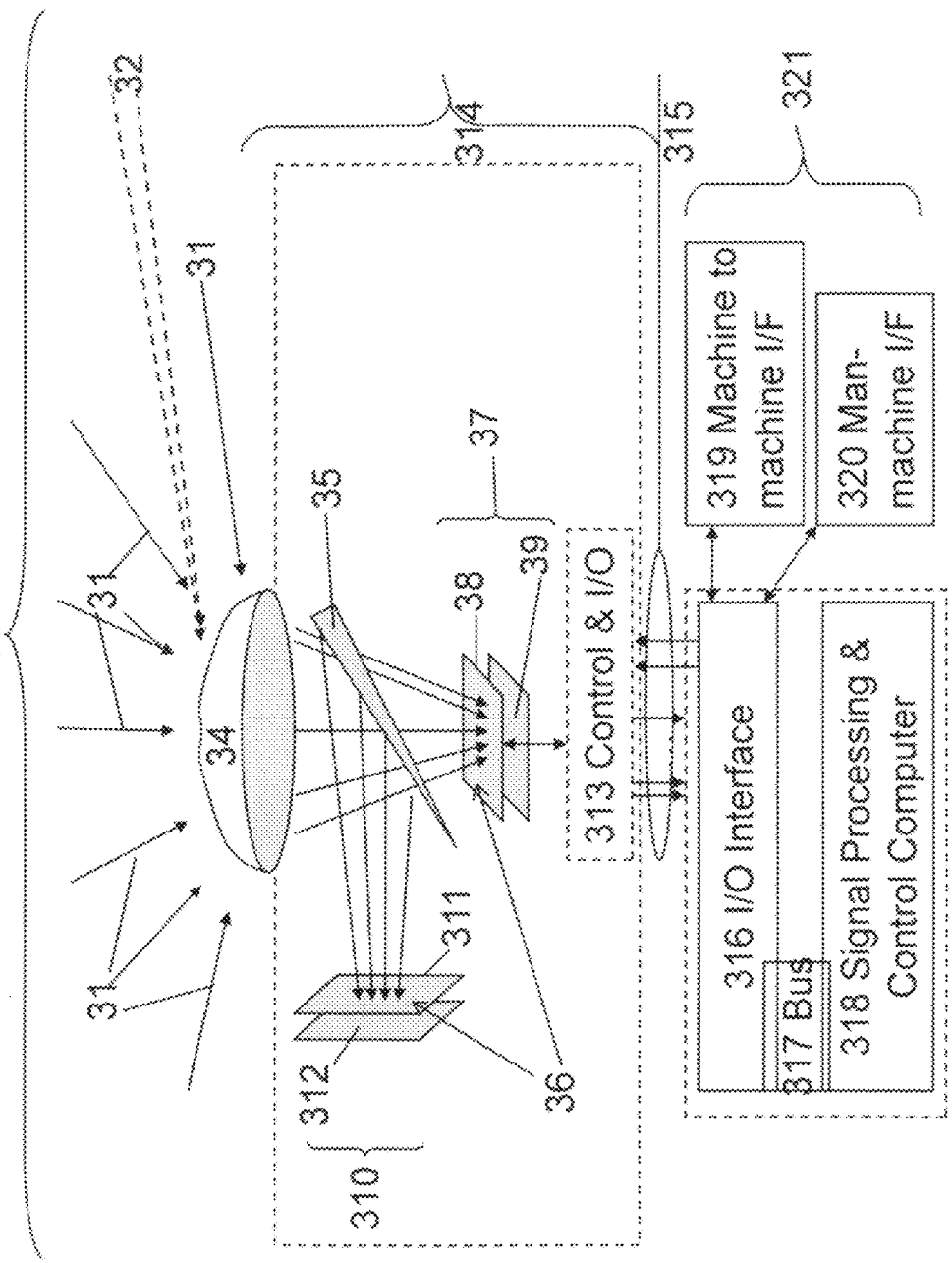
FIG. 3 is a top-level diagram of an implementation of the present invention.

The detection and signal processing of the present invention can be used for many different applications where an event of interest must be identified and classified or analyzed. However, weapons fire is the example optical event of interest that will be used below. The present invention is very effective at detecting and classifying various types of weapons fire. FIG. 3 shows a top level depiction of one embodiment of the present invention:

Optical sensor module 312 including . . .
    Optical lens sub-system consisting of lenses 34 and an optional light split element 35
    Primary PSD-FPA 37 and optional secondary PSD-FPA or secondary imaging focal plane array 310
    Control and input/output component 311
Electronic control module 319 containing input/output interface 314, a signal processing and control computer 318, bus 317, machine-to-machine interface 315, man-machine interface 316 and system software
Interconnect cabling 313 to link the optical sensor module with the electronic control module
System software including:
    Optical sensor interface software
    Signal Processing Software
    Machine and/or human interface software Incoming light 33, consisting of IR, UV and visible, enters the lens or lenses 34. This light consists of static or dynamic background 31 of no interest and, potentially, light caused by events of interest 32. The lens system 34, 35 focuses an image 36 on the focal plane(s) 37, 310 of the system. This light strikes the detector portion 38, 311 of the PSD-FPA(s) and/or PSD-FPA and imaging focal plane array 37, 310, and there, photons are converted to charges. These weak electronic signals are amplified and sampled by the Read Out Integrated Circuits (ROICs) 39, 312.

Together, the detector and the ROIC form the PSD-FPA(s) and/or PSD-FPA and imaging focal plane array 37, 310. They are bonded together physically, and electrically connected using standard indium bump interconnect methods. From there, the sampled analog signals are transmitted to the Control and I/O component 313, where they are converted to digital signals. The Control and I/O 313 also provides clock timing, precision voltages, grounds; and other necessary signals to the ROIC(s) 39, 312. Together, the lens system 34, 35; PSD-FPA 37, 310; and Control and I/O 313 form the optical sensor module (OSM) 314.

The control and I/O component 313 sends digital information to the electronic control module 321. The electronic control module 321 sends control information to the control and I/O component 313 of the optical sensor module 314. The optical sensor module 314 and the electronic control module 321 are interconnected by interconnect cabling 315. The electronic control module 321 contains system software that reads high-speed incoming data, performs signal processing, and provides for external system interfaces.

Figure 4:
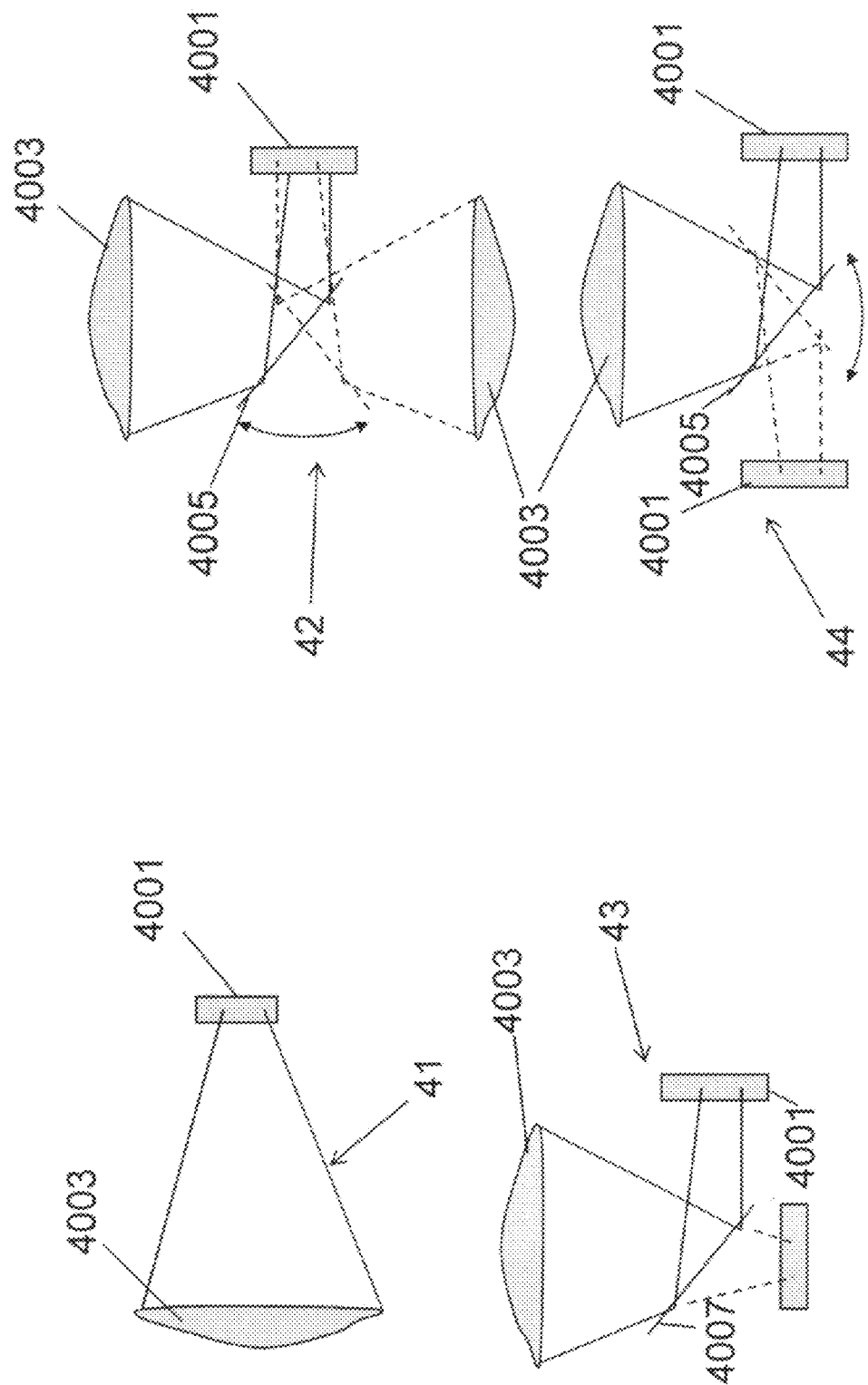
FIG. 4 is a diagram of exemplar lens sub-system configurations.

Light enters the optical lens sub-system 34, 35. As depicted in FIG. 4, the optical lens sub-system consists of multiple lenses 4003 and/or mirrors 4005, 4007 as required by a specific application. It may focus light on one or more than one focal plane array 4001. The lens sub-system may generate a continuous or segmented field of view as required by a particular application. It may use mirrors 4005, 4007, which could be fully reflective or reflect selected wavelengths only (dichroic 4007).

These multiple arrangements allow for flexible configuration options for the present invention so that, in general, it is flexible for many specific applications.

- A single lens 4003 and single PSD-FPA 4001 allows for the most compact optical sensor arrangement 41. Due to its inherent position sensing capability, the PSD-FPA supports a very wide field-of-view, for example, a full hemispherical field-of-view, while maintaining system accuracy for locating, tracking, and classifying events, including weapons fire.
- A dual-view, flip mirror, single PSD-FPA mirror design 42 allows for an entire spherical field-of-view to be imaged onto the PSD-FPA. In this design, the mirror 4005 flips back and forth to detect from one lens arrangement during some time periods, and the second lens arrangement during others.
- Mirror designs 43, 44 may also allow for more than one focal plane array 4001. Design 43 uses a folded dichroic 4007 and design 44 uses a flip mirror 4005. Dual focal plane arrays allow for two PSD-FPA's in a single system, or for combined operation of a PSD-FPA and an imaging focal plane array or other type of optical detector. Both of these combinations support split band spectral sensing, in which one FPA detects light within spectral band "A" and the second FPA detects light in spectral band "B"., where "A" and "B" are different. Spectral band sensing allows for the present invention to determine an approximate temperature for an observed event.
- Mirror designs 43, 44 with multiple focal plane arrays can also be used to passively detect weapons (or other) phenomenon with one focal plane array and to detect active laser illumination with the second focal plane array. The active laser illumination is generated externally.

Figure 5A:
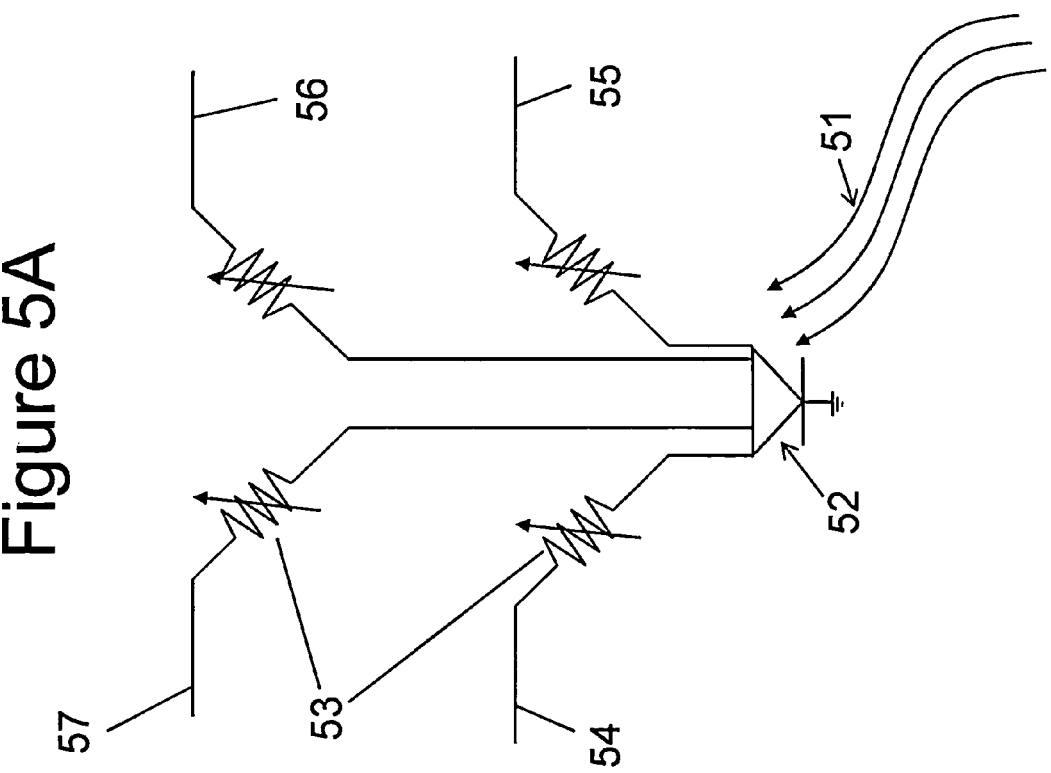
FIG. 5A is a diagram showing how each element of the PSD-FPA is modeled.

FIG. 5A is a diagram showing how each element of the PSD-FPA is modeled. Illumination photons 51 interact with the photodiode detector 52. The detector produces weak electrical currents, which pass through the four signal leads 54, 55, 56, 57, each of which exhibit a variable resistance 53. The variable resistance models the effect of the resistive layer for differing illumination locations and distributions (or centroids of the illumination 27) on the surface of the PSD-FPA element.

FIG. 5B shows how the PSD-FPA detector element 38 may connect to the ROIC 39, using industry standard indium bump interconnect 58 technology. The indium bump 58 impedance is designed to be low and the ROIC signal chain 510 presents a low impedance CTIA amplifier input 59, so that the charges generated in the detector diode are split between the four signal leads according to the variable resistance they encounter. Once these currents enter the ROIC circuit, they are amplified and sampled.

As a first step in the ROIC signal chain, background subtraction is performed. Background subtraction is a background mitigation technique that is implemented in the PSD-FPA ROIC. Background subtraction is performed separately and independently for each element and for each signal lead on the PSD-FPA. As shown in FIG. 6, each of the four legs of each PSD-FPA element may be connected to a controllable current source 62 that is located prior to the input of the low impedance CTIA amplifier 59. This current source performs background subtraction by removing a portion of the signal generated from the detector before it reaches the amplifier. Background subtraction may be turned on or off.

Figure 7:
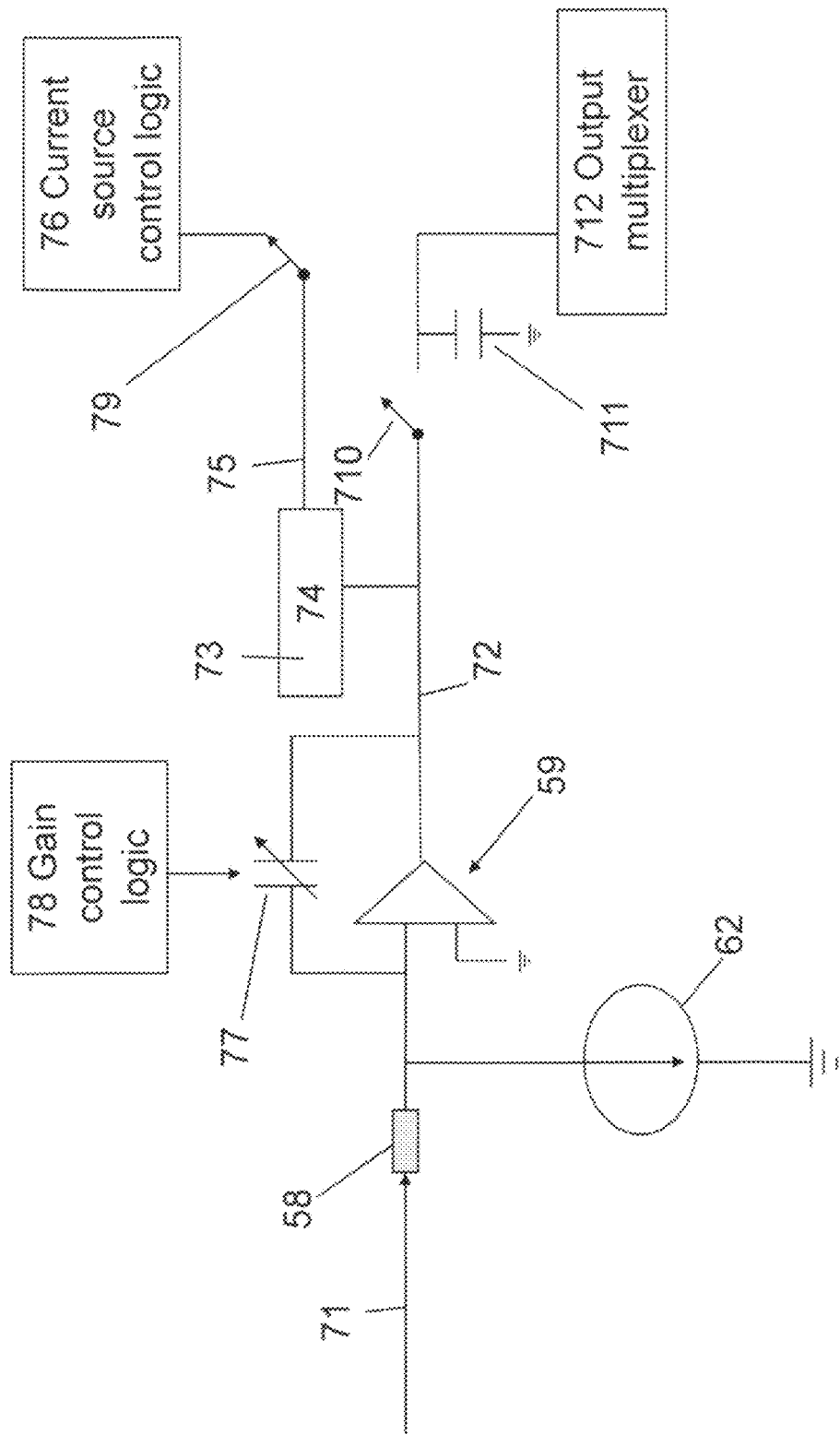
FIG. 7 is a diagram of a background subtraction calibration implementation.

When background subtraction is enabled, an initial background calibration is performed. FIG. 7 illustrates a background subtraction calibration method. First detector current 71 enters the ROIC circuit passing through the indium bump interconnect 58 and entering the low impedance CTIA amplifier 59. The amplifier produces an output voltage 72 that is compared against an adjustable comparison reference voltage 73 in a comparator 74 located at the output of the amplifier 59. The comparator 74 produces a 1 or 0 compare bit 75 depending on whether the output voltage 72 is less than or greater than the comparison reference voltage 73. The compare bit 75 value passes to the current source control logic 76. The control logic 76 will set the value of the controllable current source 62 depending on the value of the compare bit 75. The comparator bit 75 output is connected to the control logic 76 by the comparator output switch 79 only when a background calibration is commanded. This process occurs independently for each of the four signal leads. By setting the background subtraction current 62 using the comparison reference voltage 73, the background is subtracted to a predetermined level.

Figure 8:
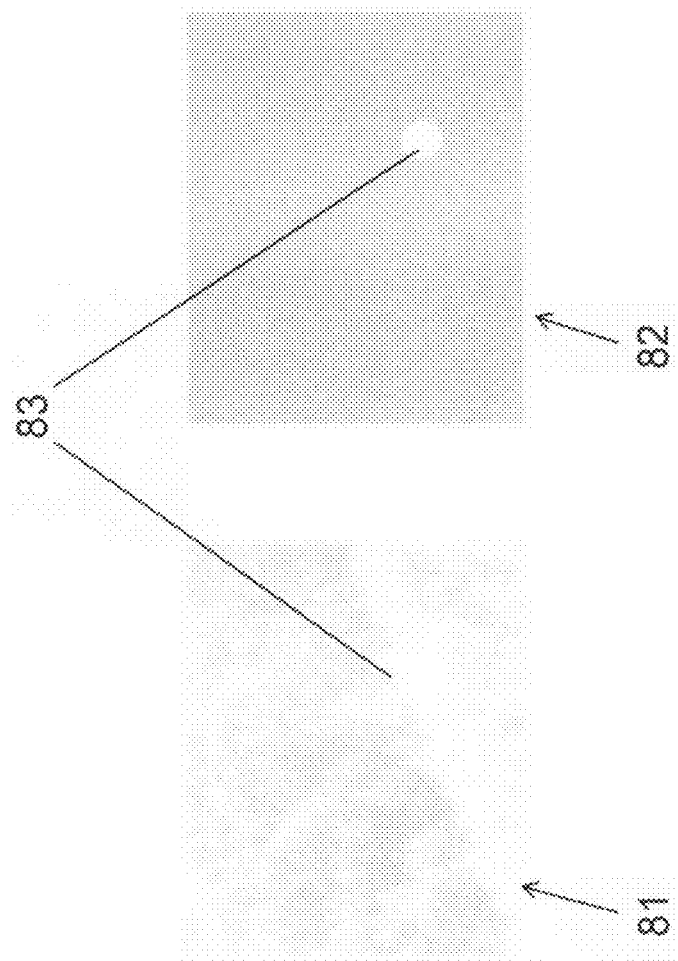
FIG. 8 is a drawing showing the use of background subtraction for clutter rejection.

As shown in FIG. 8, background subtraction removes background clutter and flattens the scene intensity to a specified brightness—the brightness is determined by the voltage setting controlled in software. The Figure presents two scenarios. Scene 81 is an event with no background subtraction and contains a bright signal of interest 83 against a background as seen without background subtraction. Scene 82 is an event with background subtraction and contains the same signal of interest 83 as it would be seen with background subtraction.

Once background subtraction is operating, background calibration can be performed at a set frequency, for example 50 times per second, or as needed, for example whenever the observed background changes by more than a certain amount. This is dynamic background subtraction. Performing dynamic background subtraction at a set frequency creates a flexible method for mitigating slowly changing signals. This "AC coupling" allows the system to ignore relatively slow signal changes that may be associated with moving backgrounds or other events of no interest with zero processing burden on the system software. Performing background subtraction whenever the scene changes by a certain amount is a control method that allows the system to ensure that contrast and signal levels remain within a preset range.

After background subtraction, the PSD-FPA ROIC may amplify the signal with a Capacitive Trans-impedance Amplifier (CTIA) with variable gain. Variable gain extends the operating range of the PSD-FPA. Extended operating range allows for flexible configurations of the present invention using different optical lens sub-systems, which produce different light levels. It also allows the present invention to operate in environments with different light levels.

Variable gain may be implemented by using multiple integration capacitors and controlling the integration time in the PSD-FPA readout circuit. Both integration capacitance and integration time are controlled directly by the control and I/O component in the optical sensor module and indirectly by software in the electronic control module computer. The selected integration capacitance and integration time are common for all elements and signal leads on the PSD-FPA. FIG. 7 illustrates the variable capacitor 77 that may implement the variable gain CTIA. The gain is controlled by the gain control logic 78. Also, the resulting output is stored on a sample and hold capacitor 711, which is connected dynamically to the CTIA using the sample and hold switch 710. Output from each signal leg is connected to the output multiplexer 712.

In addition to variable gain, the PSD-FPA implements a dual-gain, fast switchover function referred to as "tripwire". Tripwire allows an individual PSD-FPA element to go from a high gain setting to a low gain setting within a single frame read time, for example $1/10,000^{th}$ second. Tripwire prevents the PSD-FPA element from saturating when an extremely bright signal is observed. This capability is important for the weapons fire detection application, since these events may generate extremely bright optical signals. Tripwire allows for an expanded instantaneous dynamic range, for example a gain range that is up to 1000× larger than would otherwise be possible.

Figure 9:
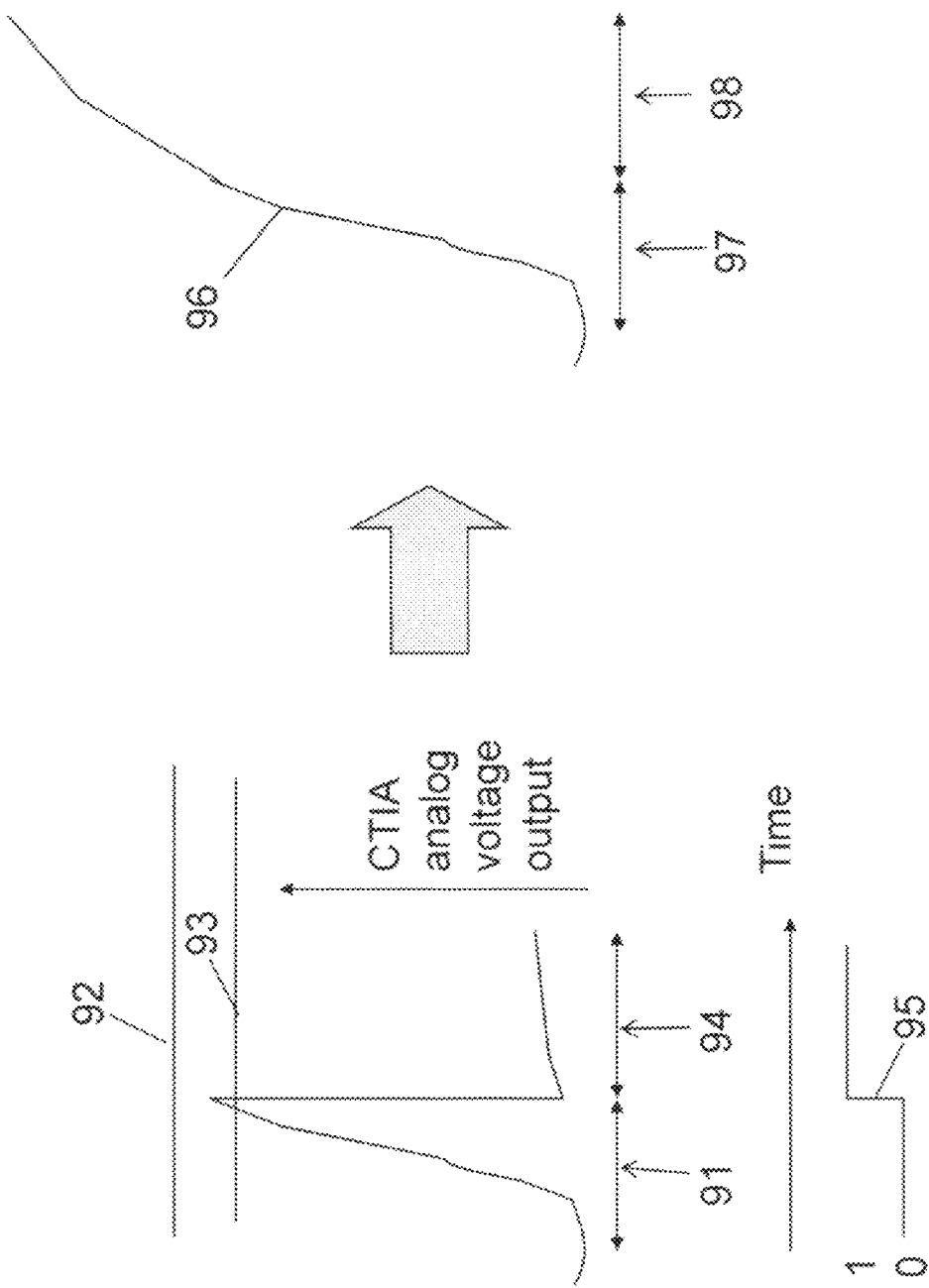
FIG. 9 is a chart illustrating the trip-wire concept.

FIG. 9 depicts the tripwire concept. Initially, the CTIA operates in the normal gain mode 91, which is the variable gain that is set by computer control. As shown, as the CTIA output rises toward the saturation voltage 92, it exceeds the tripwire threshold 93. At this point, the ROTC changes the gain by changing the variable capacitor 77 and by using a second integration time, which is programmable. From this point in time, the CTIA operates at the tripwire gain 94 setting. In addition, a tripwire indicator bit 95 is set to 1. Signal processing software uses the tripwire indicator bit to create a reconstructed waveform 96 that shows the event intensity on an expanded scale. It does so by applying a normal gain multiplier 97 for data received with the tripwire bit 95 set to zero and a tripwire gain multiplier 98 for data received with the tripwire bit 95 set to one.

Figure 10:
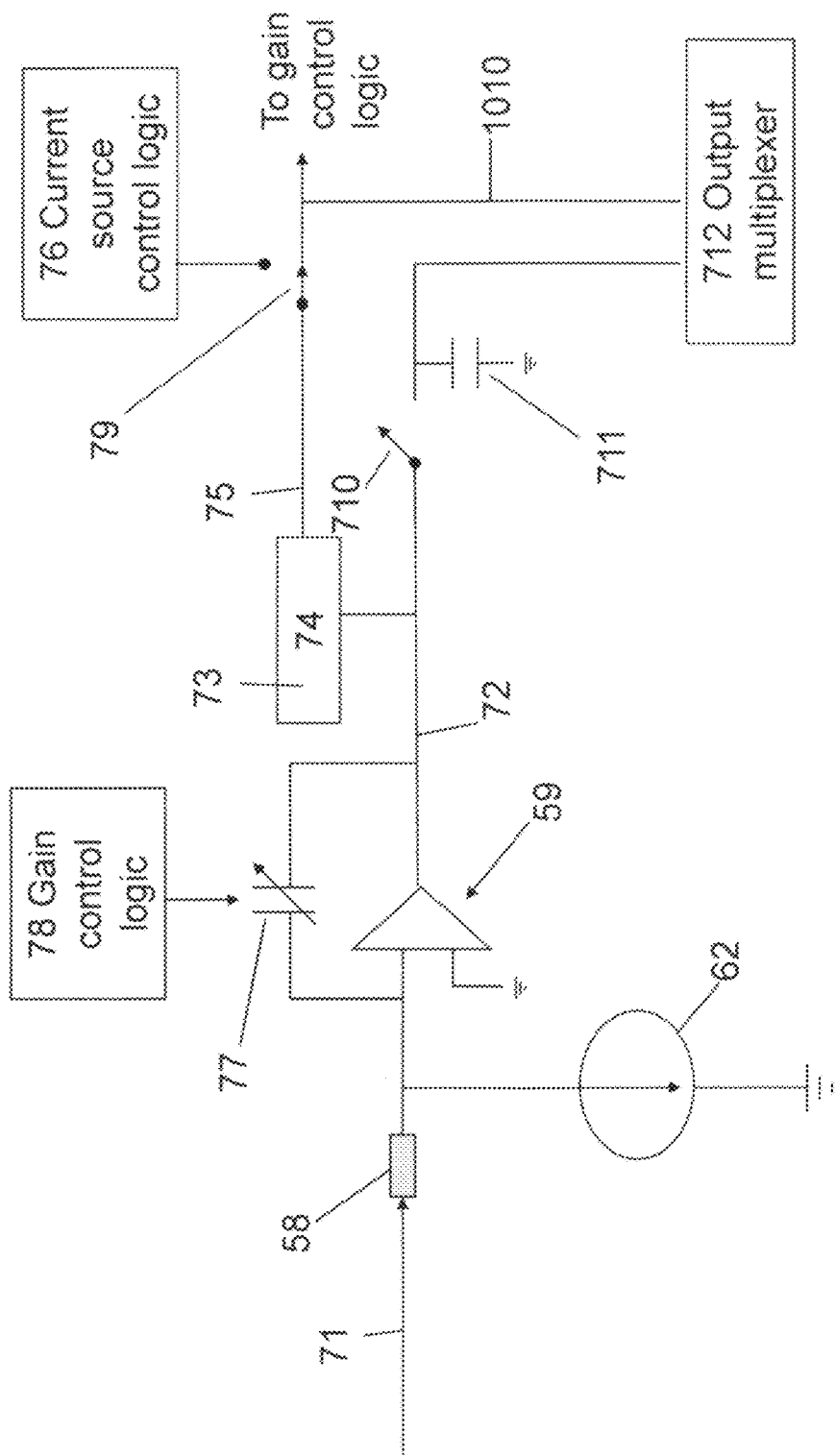
FIG. 10 is a schematic diagram of a tripwire circuit.
Figure 11:
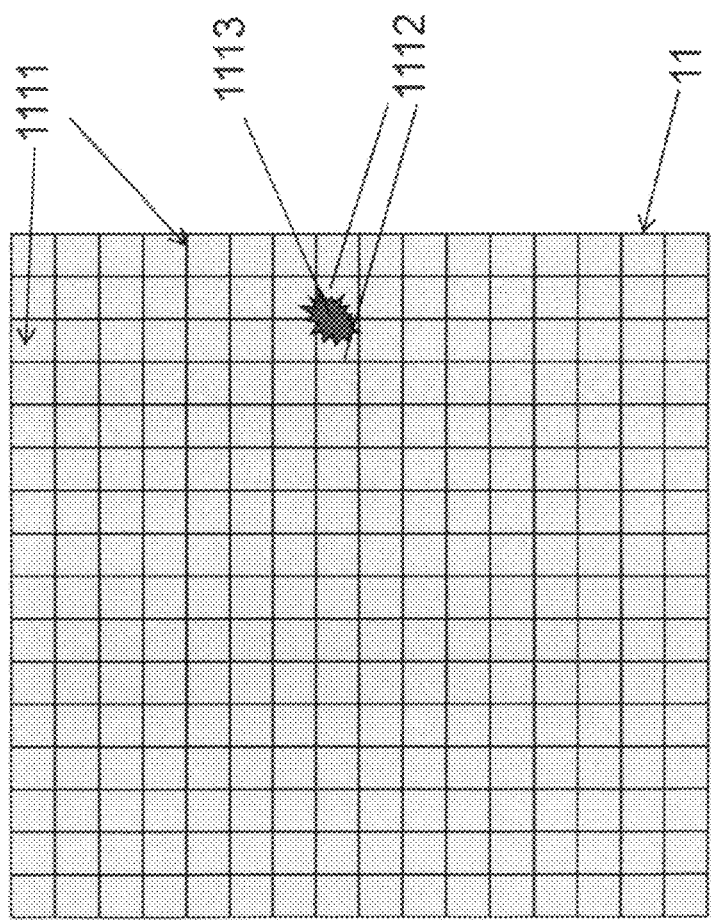
FIG. 11 is a drawing illustrating the effect of the tripwire circuit on elements of the PSD-FPA.

As shown in FIG. 10, the tripwire may be implemented using the comparator 74 at the output of the ROIC amplifier 59. When the ROIC circuit is not in background calibration mode, the comparator bit switch 79 sends the output of the comparator to both the output multiplexer 712 and to the gain control logic 78. At the output, the comparator bit represents the tripwire bit value 1010. If the comparator trips, the gain control logic 78 sets all four ROIC circuits for a PSD-FPA element to the tripwire gain setting. As shown in FIG. 11, only the PSD-FPA element or elements that sense the bright optical signal go into the tripwire low gain range. On the PSD-FPA 31, two elements 1112 sense a bright optical event 1113. If the optical signal is larger than the tripwire threshold, these elements 1112 would be set to the tripwire gain. The other 254 PSD-FPA elements 1111 with normal background illumination stay in the normal (high) gain range.

After the detector signals are background subtracted and amplified with variable gain or tripwire gain setting, they are multiplexed to the output stage of the ROIC. There, the signals are sampled, amplified, and passed to the control and I/O component over external wiring and connectors.

Figure 12:
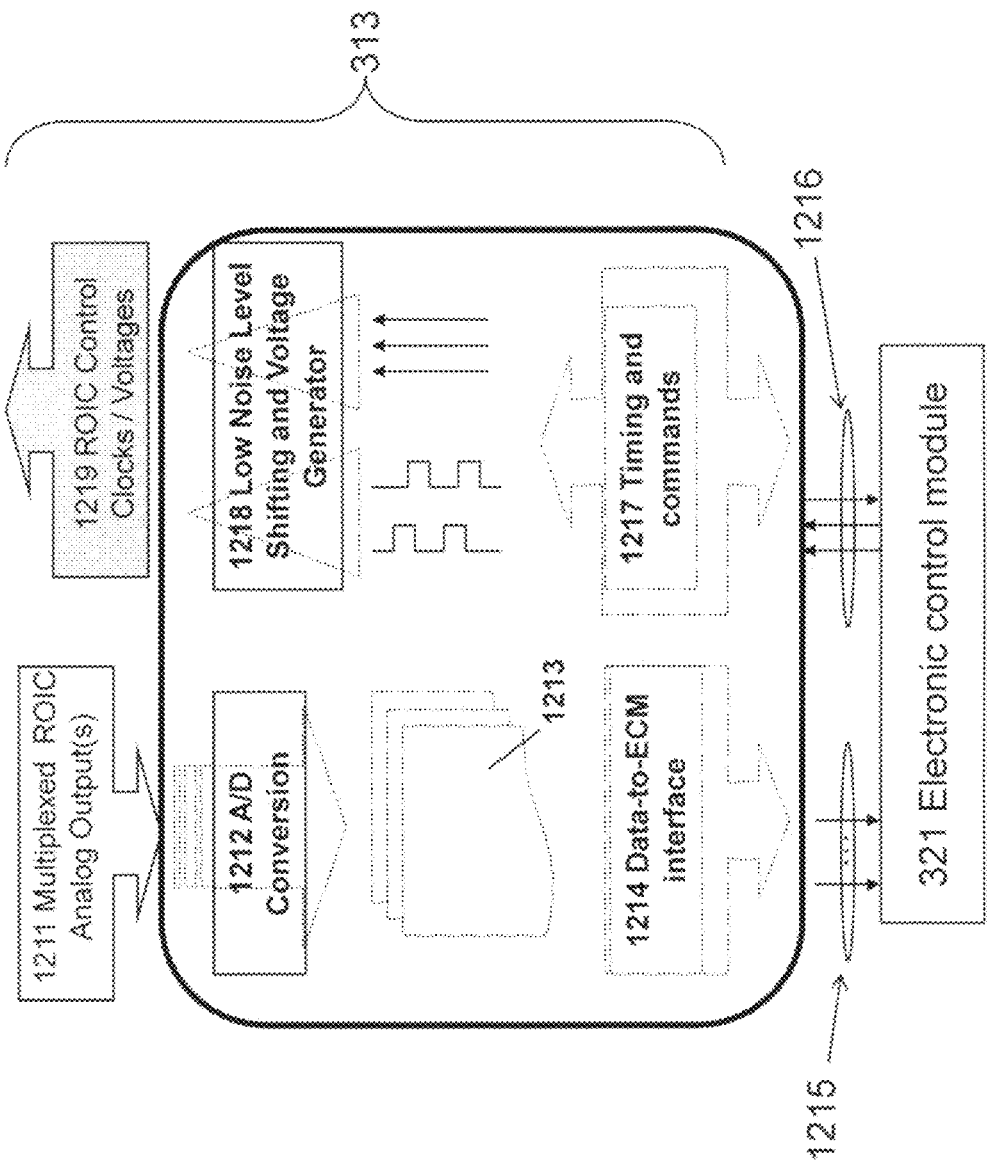
FIG. 12 is a diagram illustrating the operation of the control and input/output component.

As shown in FIG. 12, the control and I/O component 313 performs analog to digital conversion 1212 on the sampled analog output signals 1211 from the PSD-FPA ROIC. The control and I/O component 313 stores multiple digitized data samples in a temporary memory, a memory buffer 1213, and when the buffer is full, it sends the data to the electronic control module 321 via an electronic data-to-ECM interface 1214. The number of data samples that are sent is flexible and depends on the hardware implementation of both the control and I/O component 313 in the optical sensor module 314 and the input/output interface 316 in the electronic control module 321. The control and I/O component 313 transmits the data using a common electrical format, such as Low Voltage Differential Signaling (LVDS). The data is sent over interconnect cabling 1215. The electrical signal format and the design of the interconnect cabling 1215 allow the electronic control module 321 to be located several meters away from the optical sensor module 314.

The control and I/O component 313 also receives timing and control information 1216 from the electronic control module. This information is used to generate timing and commands 1217. The Control and I/O component 313 also uses a low noise level shifting and voltage generator 1218 to generate precision control clocks/voltages 1219 for the ROIC 39.

As shown in FIG. 3, the electronic control module 321 contains an input/output interface 316 and the signal processing and control computer 318. The I/O interface circuitry 316 sends and receives information to and from the optical sensor module 314 and sends and receives data to and from the signal processing and control computer 318. The signal processing and control computer operates autonomously and semi-autonomously according to its stored computer program and external commands it may receive. It performs signal processing to detect and characterize events, and it sends control commands to the optical sensor module 314 via the I/O interface circuitry 316, where the control and I/O component 313 interprets the control commands, and adjusts ROIC timing and control signals accordingly.

Figure 13:
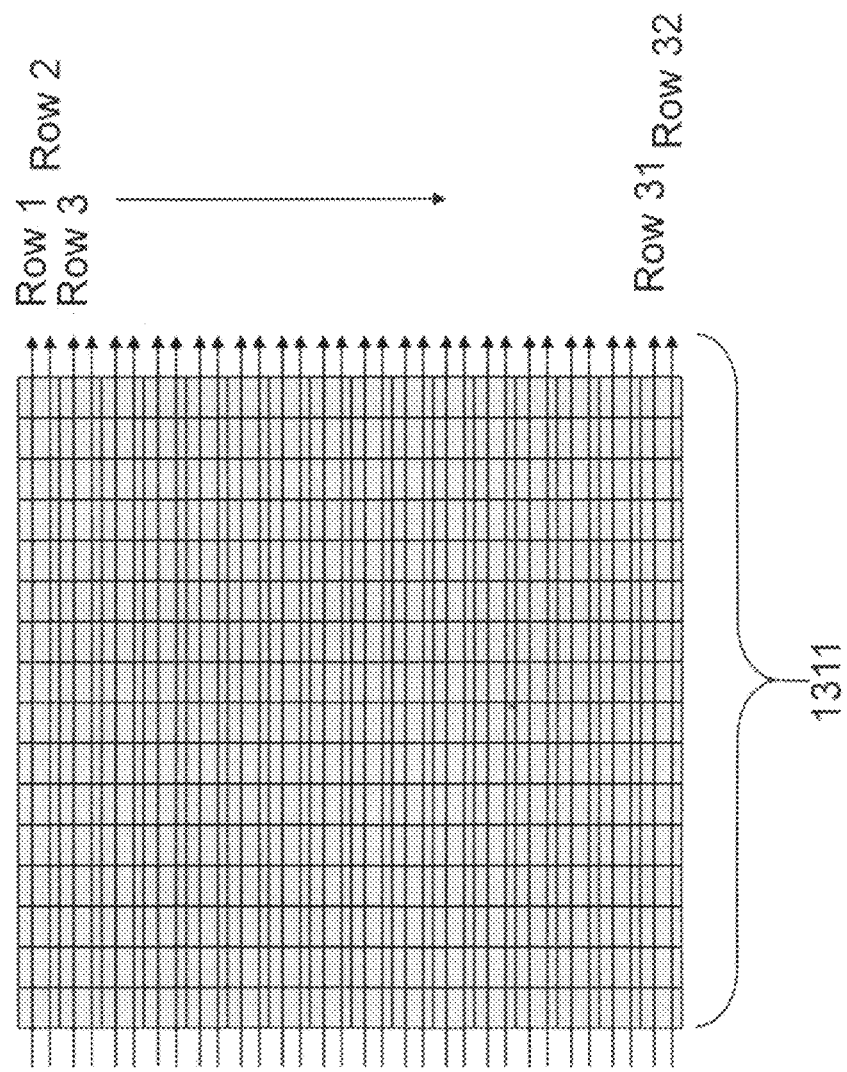
FIG. 13 is a diagram illustrating the organization of data sent to the electronic control module.

When it receives data from the optical sensor module, the I/O interface 316 organizes the data received from the optical sensor module so that it is formatted as rows and frames of data. FIG. 13 illustrates this concept. Here, a row of data 1311 consists of 32 column samples from the PSD-FPA and a frame of data 1312 consists of 32 rows. The I/O interface synchronizes the data input so that the start of a frame and start of a row are unambiguous for the data handling processes in the signal processing and control computer.

Figure 14:
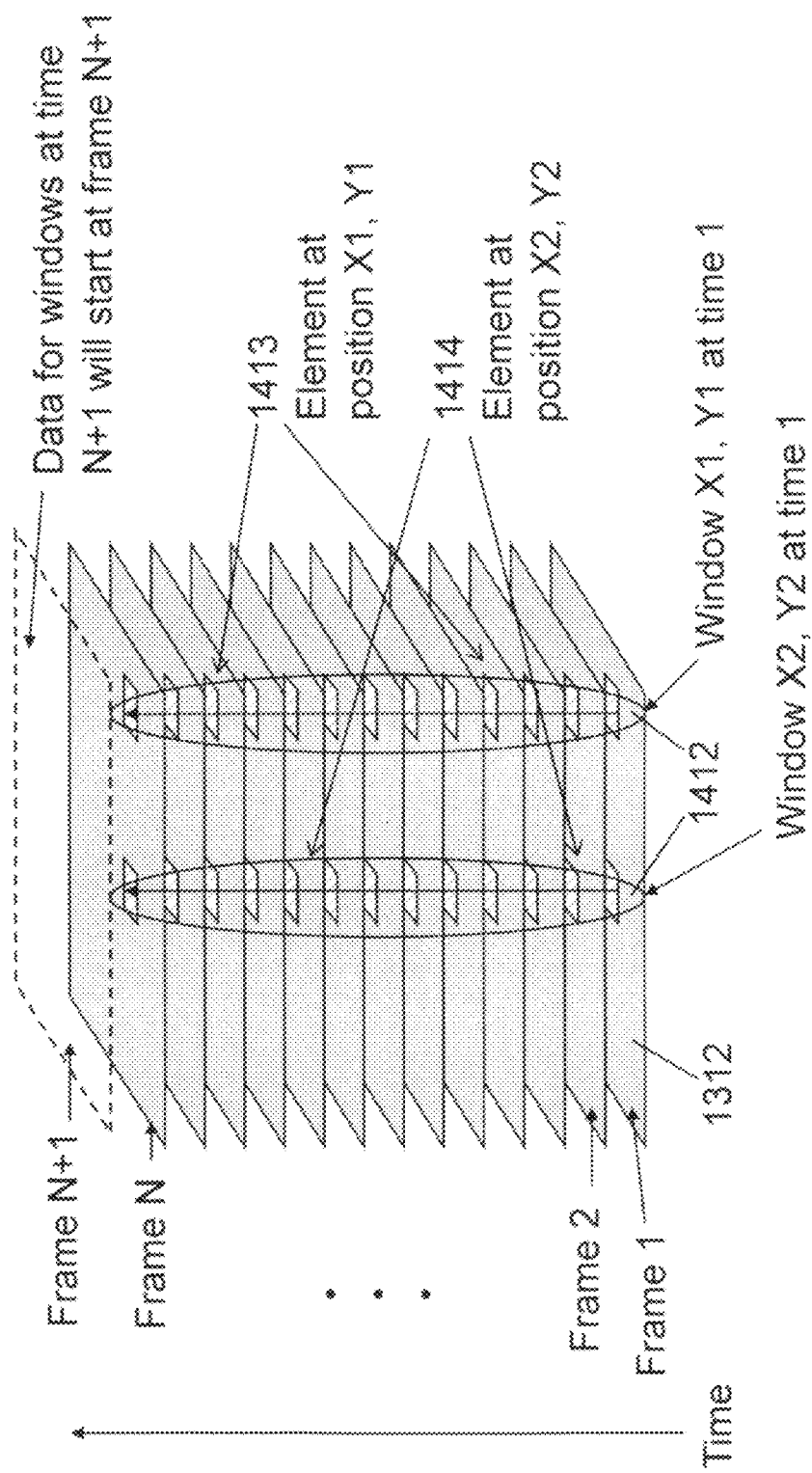
FIG. 14 is a drawing illustrating the data handling performed by the signal processing and control computer.
Figure 15:
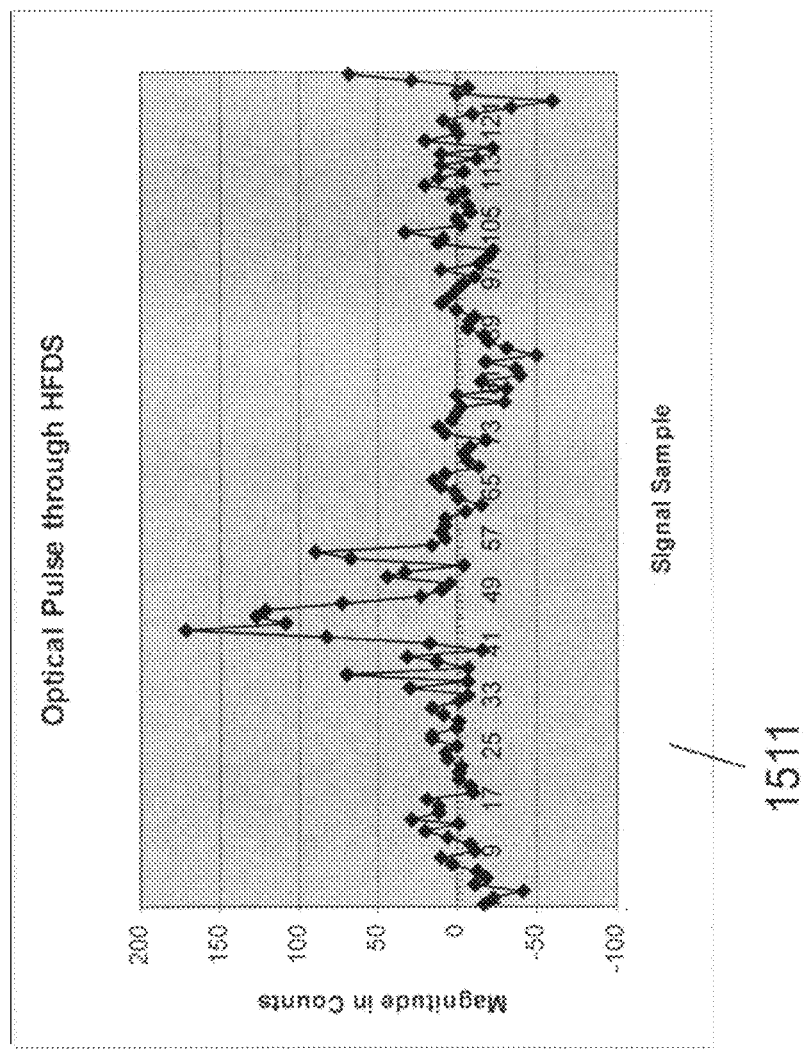
FIG. 15 is a two-dimensional time-intensity waveform graph.

The signal processing and control computer receives data as frames. In order to perform signal processing, it stacks several frames 1312 as shown in FIG. 14 and forms data windows 1412. Each data window contains the signals from a single PSD-FPA element 1413, 1414, which are organized in time sequence. For signal processing, any number of data samples can be used to form windows, the data can be used multiple times, and multiple window lengths can be used simultaneously. Typical numbers of samples in data windows are 64, 128, 256, etc. The data window sequences can be represented as two dimensional time-intensity graphs 1511, as shown in FIG. 15. Signal processing is done using the time-intensity values for each of the four signal leads individually or by summing them to form total time-intensity values for the PSD-FPA element.

As a first step in signal processing, the present invention autonomously determines an event detection threshold based on the signal variation within a data window. This threshold is based on the average sample-to-sample signal change. For example, for a data window with 128 signal samples, the following threshold calculation may be performed:

$$\text{Threshold} = K^* \frac{1}{127} \sum_{1}^{127} \text{ABS}(S_J - S_{J+1})$$

where K is a constant and Sj is the jth signal sample in the window. The $$\frac{1}{127} \sum_{1}^{127} \text{ABS}(S_J - S_{J+1})$$

calculation is a computationally efficient method for determining the average sample-to-sample signal change. For additive white Gaussian noise (AWGN), this calculated value is approximately $\sqrt{2/\pi}$ times the standard deviation of the signal. The constant K is based on the probability distribution of background signals 31. $K^*\sqrt{2/\pi}$ equals the number of standard deviations from the mean signal value at which the threshold will be set for AWGN. For setting the value of K, experimentation and validation has shown that an adjusted AWGN model is acceptably accurate for both mobile and stationary optical backgrounds.

Figure 16:
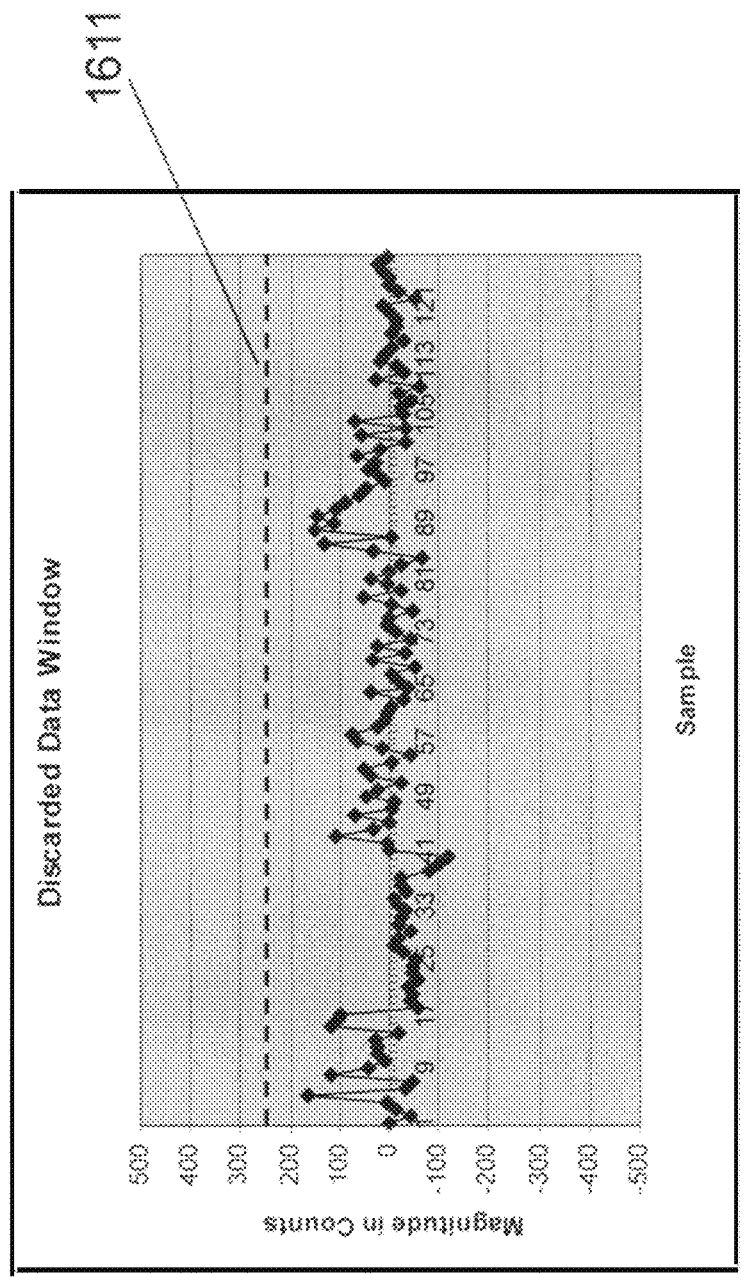
FIG. 16 is a two-dimensional time-intensity waveform graph of a data window of no interest.

All windows that do not contain a pulse or signal rise that exceeds the event detection threshold 1611 are discarded, as shown in FIG. 16. This method allows the system to discard windows that do not contain a feature of interest with minimal signal processing. For example, setting K to approximately 6.5 eliminates 99.99% of all windows that do not contain actual events of interest. Setting K to approximately 9 eliminates 99.9999%+ of all such windows. The event detection threshold calculation is designed so that it is performed using only addition and shift operations. This technique consumes only a small percentage of the full processing capacity of a modern CPU.

By effectively minimizing the processing for the great majority of data windows, the present invention can perform sophisticated signal analysis on the windows that do contain features of interest. Streamlining the processing in this manner eliminates the need for special computer hardware, and it enables more sophisticated signal processing methods to be applied. This processing strategy can be employed for any type of optical sensor (not just PSD-FPA) and for any application, optical or non-optical, where irregular events must be detected and distinguished from background noise.

Because the event detection threshold is calculated using only those data samples from within a single window, it is independent in spatial dimension and in time. Thus, the event detection threshold varies across the PSD-FPA (element-to-element variation) or other sensor type, and it varies in time. This feature supports mobile operation, operation in areas with large scene differences, and operation in environments with time varying characteristics.

Figure 17:
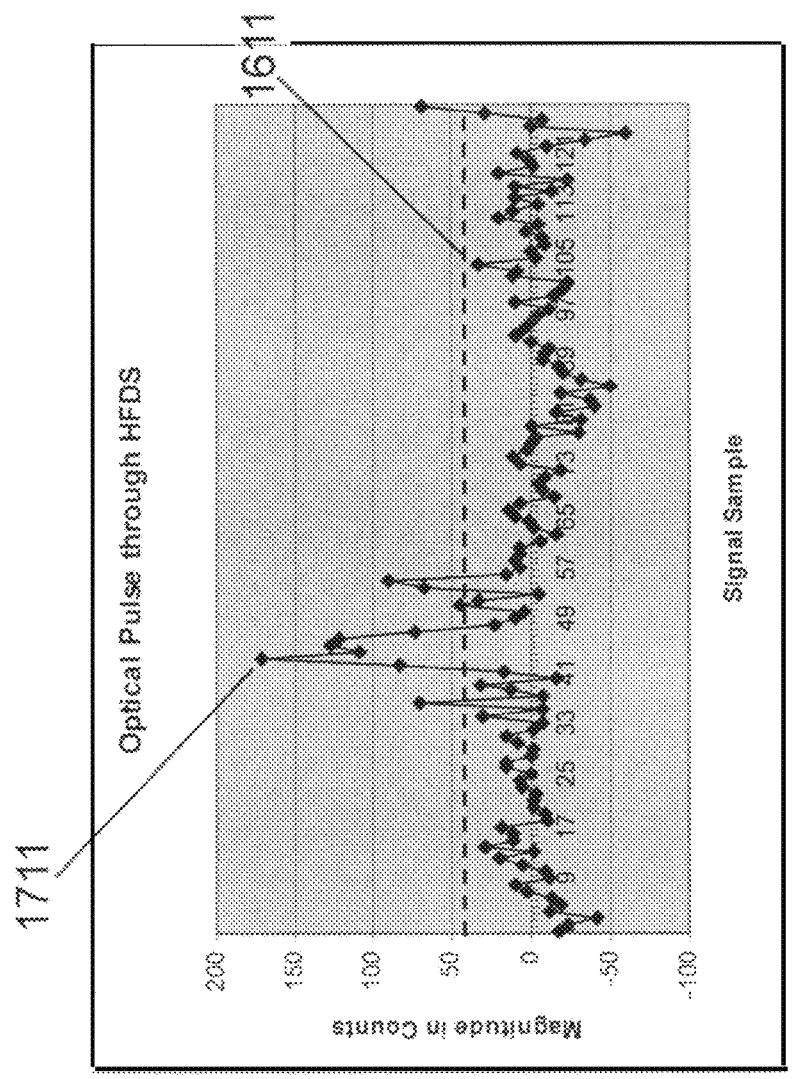
FIG. 17 is a two-dimensional time-intensity waveform graph of a data window of interest.

Any data window that contains at least one optical pulse to examine 1711 or signal rise that exceeds the event detection threshold 1611 is processed to determine the nature of that event, as shown in FIG. 17. Time-intensity analysis is performed to determine what type of event the data window contains. This analysis may indicate that the event is simply a background shift or noise event, i.e. an event of no interest or a false alarm. Alternatively, it may indicate that the event is most probably an event of interest. Time-location correlation analysis is performed to confirm that the observed optical phenomenon originated from a real location. This eliminates noise induced false alarms and background shift induced false alarms. Time-location correlation analysis is uniquely enabled by the PSD-FPA.

Figure 18:
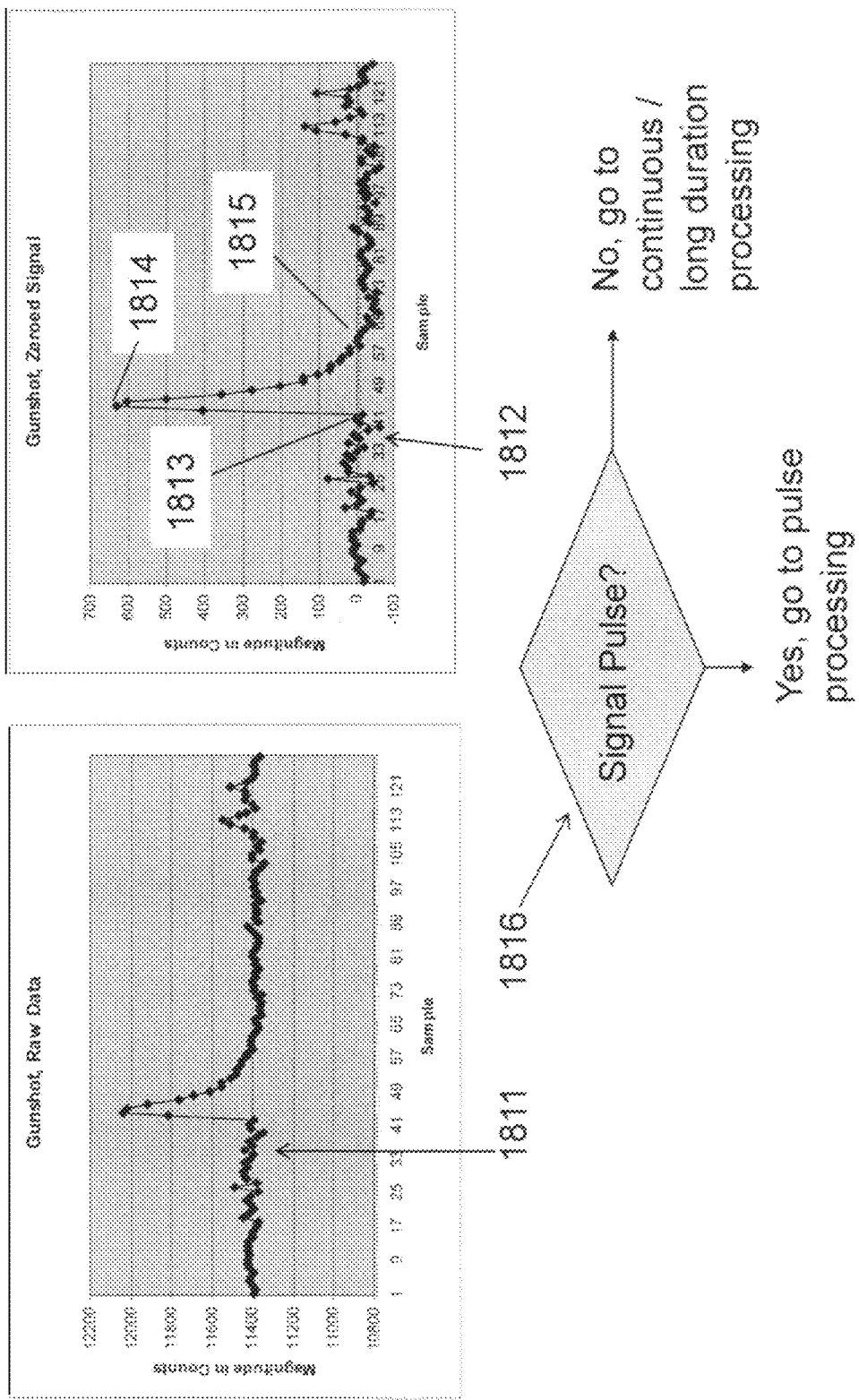
FIG. 18 is an illustration of the initial processing of raw data.

Time-intensity analysis is performed as follows. First, as shown in FIG. 18, the raw data samples 1811 are shifted so that the average background value is zero, forming zeroed signal 1812. Then, an initial test is conducted to determine if the observed event is a signal rise or a signal pulse. This initial test determines the start point 1813 of the pulse or rise, the maximum point 1814, and in the case of a pulse, the end point 1815. Pulse and continuous/long duration events are processed separately 1816. This processing strategy is useful for many applications; optical and non-optical, where irregular signals must be distinguished from background noise. Processing for pulse events is described first.

Figure 19:
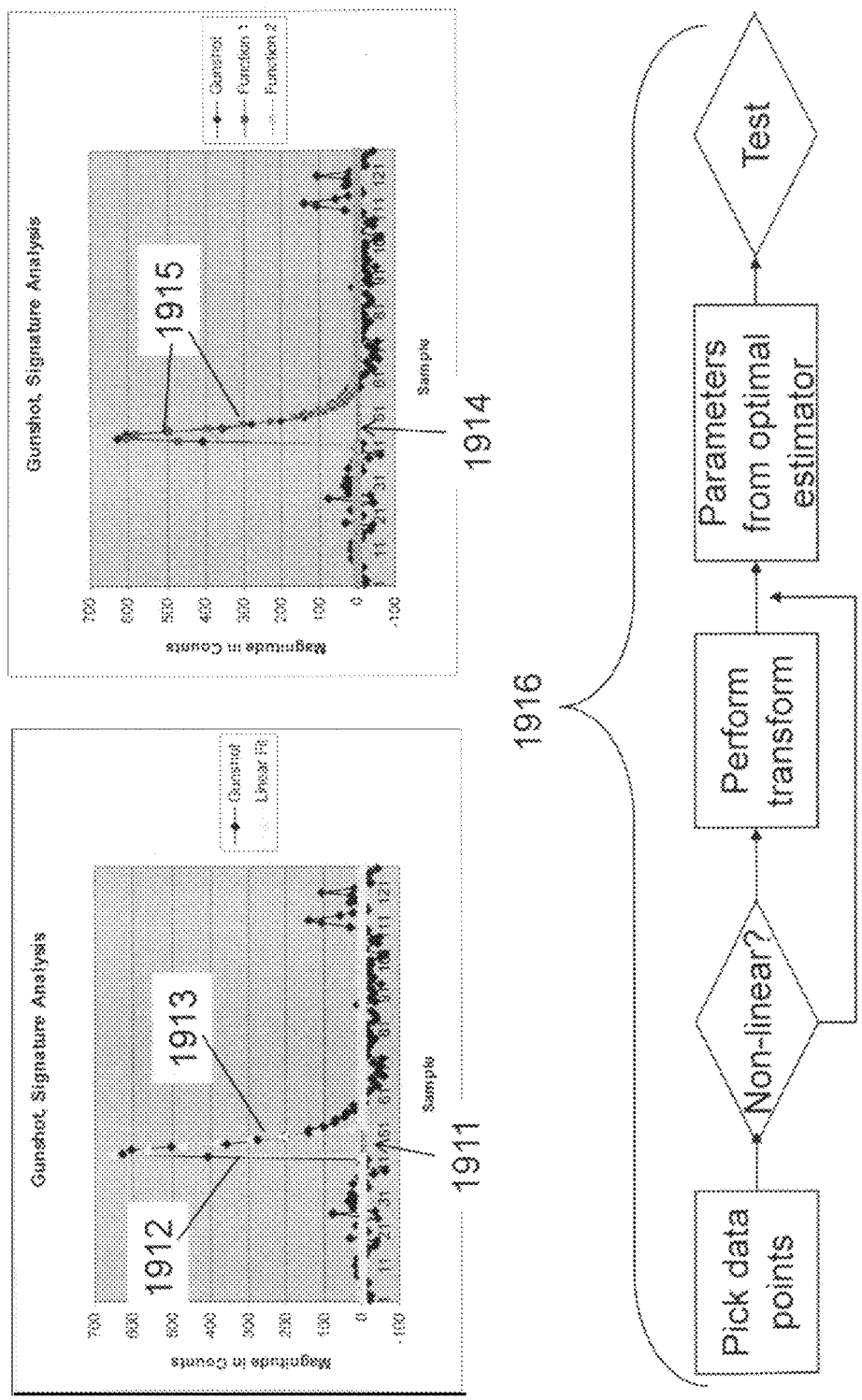
FIG. 19 is an illustration of the time-intensity signature analysis tests applied to pulses.

Multiple time-intensity processing tests are applied to optical signals of interest. FIG. 19 illustrates the time-intensity signature analysis method applied to pulses with two exemplars. First, line fit equations 1911 (i.e. mx+b) are calculated: one for the rising edge of the pulse 1912 and one for the falling edge 1913. Least squares estimation is used to determine the slope and intercept for these lines. The present invention compares the ratio of the rising and falling slope to determine if it falls within the range typical for gunshot, explosions, bullets, other projectiles, or not. If the test is within the typical range for a particular weapon (or other event) type, it passes. If not, the test fails. This strategy can also be employed in other detection systems where the possible classifications exhibit typical signal parameter ranges. As a second test, the present invention determines the error between the fit lines and the actual data. If the error exceeds a typical bound, the test fails; otherwise, it passes.

FIG. 19 also illustrates time-intensity signature analysis using two non-linear functions 1914 that are fit to the observed optical pulse data using parameter estimation techniques. In general, time-intensity signature functions model the intrinsic pulse shapes that result from certain types of events, and they are referred to as the signature functions. As in the linear fit case, the system uses the information about the start point and the maximum point of the observed pulse to pick the data samples to use in the analysis. The data samples are transformed using a non-linear transform, which is the inverse of the signature function.

Then, least squares analysis is performed on the transformed data to determine parameters for the signature function. This determines the fit curves as shown 1915. The parameters for the signature functions are compared with parameters typical for different classes of events, for example gunshots, bullets, etc., and if they fall within a typical range, the parameter comparison test passes for that type of event. This strategy can be employed in many detection systems where the possible classifications exhibit typical signal parameter ranges. In addition, an error metric for both curves is calculated. The error metric measures how much the actual data points deviate from the signature function data points. If the error exceeds a typical bound, the test fails.

The fit curves 1915 may be described by the signature function $$F(J)=K*J*\exp(1-L*J),$$

where j is the time index for the function, e.g. $X_J$ is the jth sample in the sequence and both L and K are estimated parameters. The transform function used for F(J) is $X_{J,TRANSFORM}=\text{Ln}[X_J/J]$. J=0 for the data point at the beginning of the signal rise 1813. Only those points from the maximum point of the pulse 1814 until the end point are used to estimate the F(J) parameters K and L. For gunshots, or any type of weapon that produces a muzzle blast, parameter L can be used for weapon typing. For example, pistols typically exhibit an L value of 0.45 to 0.55, whereas military rifles typically exhibit values of 0.3 to 0.4. This allows the present invention to classify guns and cannons into weapon categories, e.g. pistol, assault rifle, or large caliber gun. A similar approach can be used for other types of events with identifiable patterns.

The processing steps indicated in the flowchart 1916 are used for both examples shown in FIG. 19. Six tests are performed using the linear fit method and the two signature functions. In full system operation, the present invention performs a minimum of 12 time-intensity signature tests. Additional tests allow for more robust characterization and validation, or for optimizing the system for a particular mission.

Figure 20:
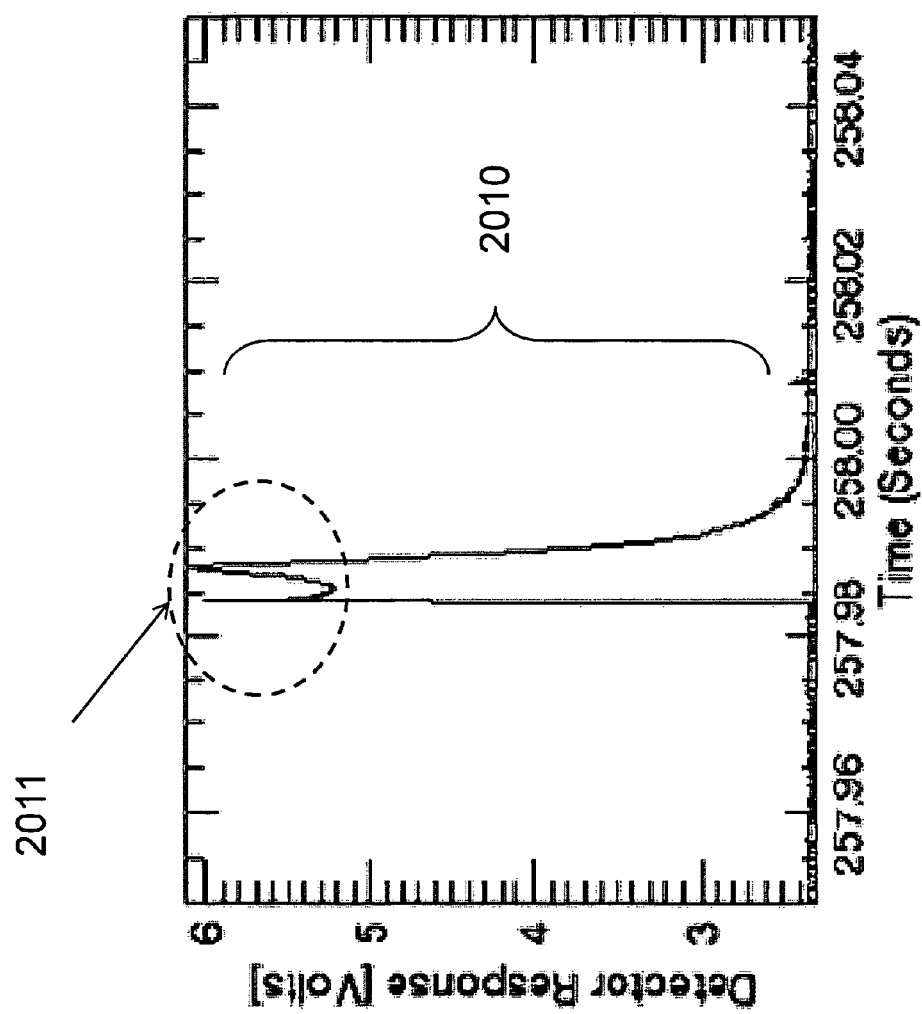
FIG. 20 is an illustration of a gunshot muzzle flash with a unique shape artifact.

The full suite of time-intensity analysis and tests for the present invention include:

Detection of unique waveform shapes associated with specific weapons (or other events), as shown in FIG. 20. Here, the optical pulse associated with a gunshot muzzle flash 2010 exhibits a "double-hump" 2011 shape in the waveform that is unique to a particular type of deer hunting rifle.

Figure 21:
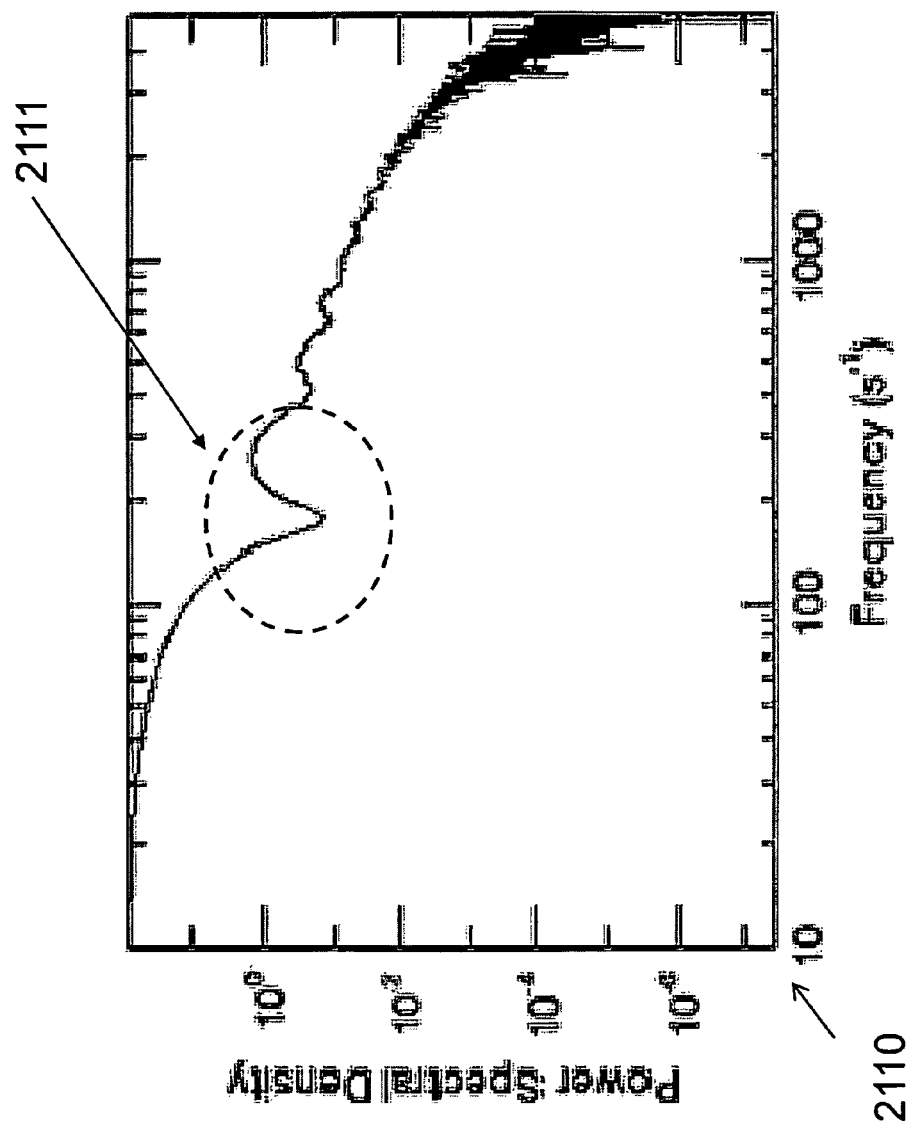
FIG. 21 shows the Fourier power series of a gunshot muzzle flash.

Digital filtering of the window data, where filter responses and ratios are the parameters for comparison and test Fourier analysis of the window data, where Fourier coefficients and frequency power components and ratios are the parameters for comparison and test. For example, FIG. 21 shows the Fourier power spectrum 2110 for a particular type of weapon that exhibits a unique attribute 2111 at 173 Hz.

Figure 22:
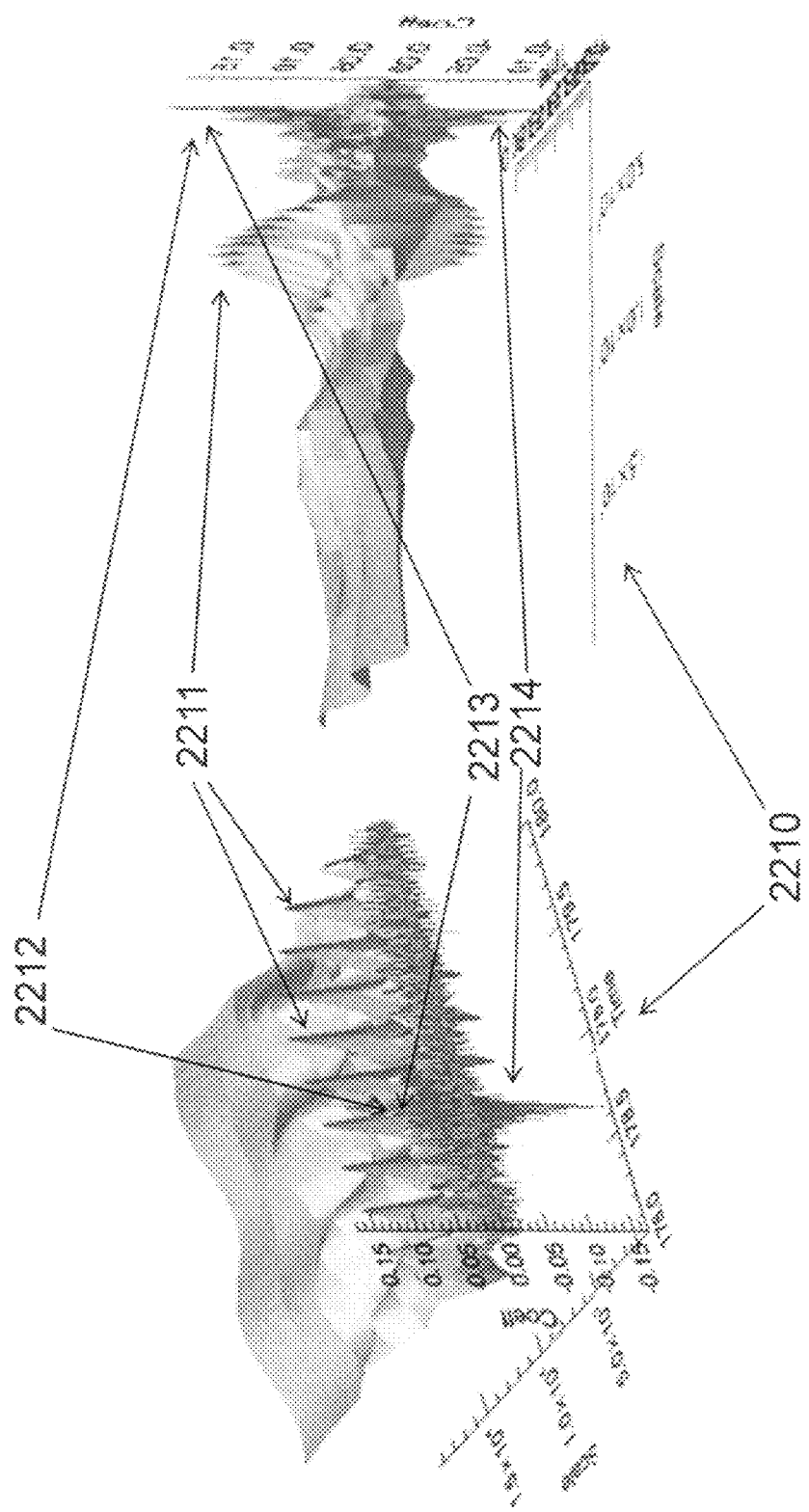
FIG. 22 shows a three-dimensional wavelet plot in two orientations.

Wavelet analysis of the window data, where scale coefficients and scale features in the time dimension are the parameters for comparison and test. FIG. 22 shows a three-dimensional wavelet plot 2210 depicting intensity on time and scale axes. The plot is shown in two orientations. The wavelet analysis clearly distinguishes a large noise signal 2211 from a gunshot muzzle flash 2212. The gunshot muzzle flash exhibits sequential and nearly equal positive 2213 and negative 2214 magnitudes on the time axis, which is consistent with all weapons that produce a muzzle blast when using the Morlet wavelet.

Figure 23:
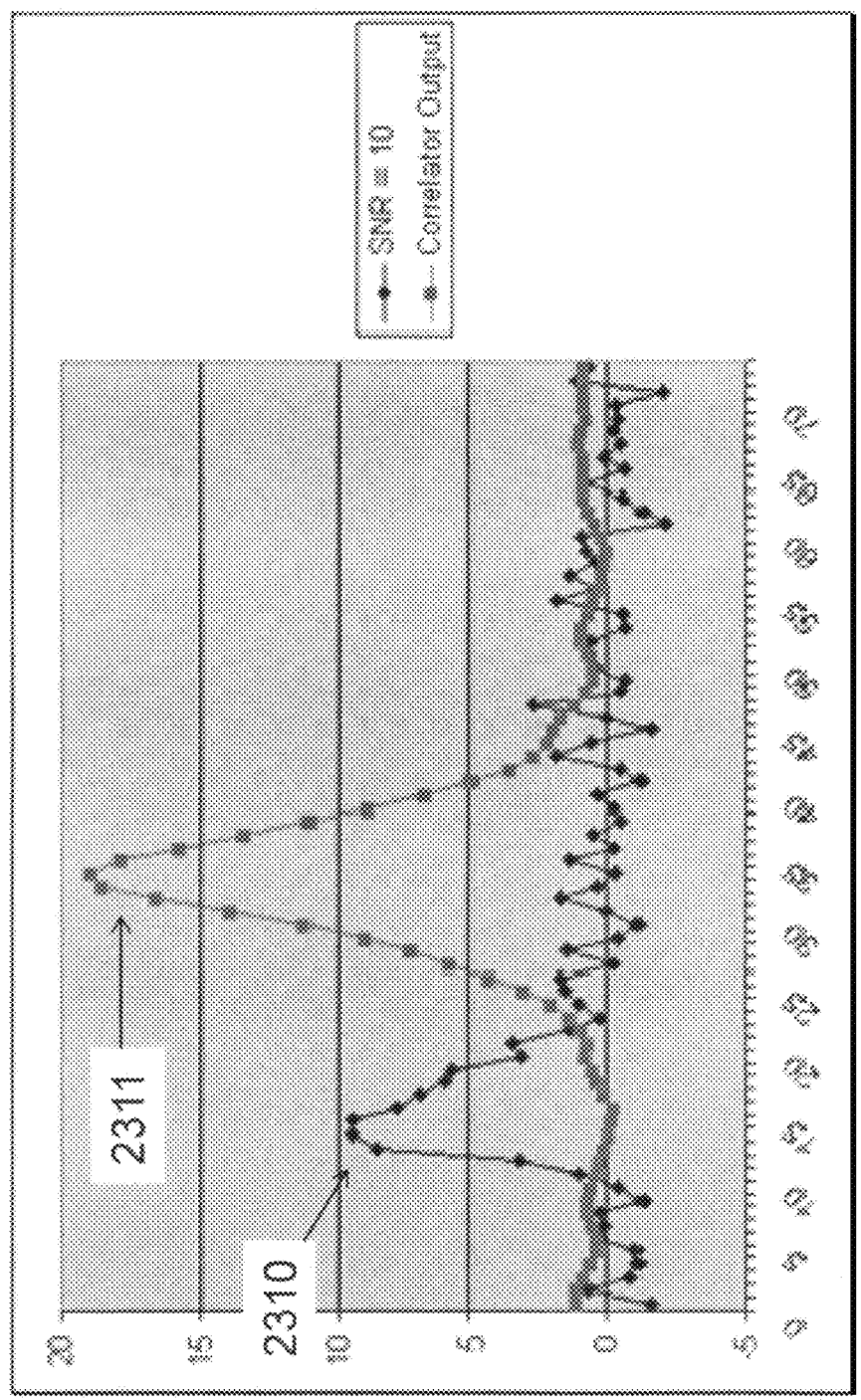
FIG. 23 illustrates signal correlation.

Signature analysis (as described above) where function parameters, their ratios, and error metrics are the parameters for comparison and test Correlation methods, where the total error is the parameter for comparison and test. FIG. 23 shows the output of a correlation 2311 calculated between a gunshot waveform 2310 and the fit curve 1915. Parameters L and K are used to determine the precise function shape for 1915.

Although all of these individual mathematical techniques are well-known, their combined application to optical sensing is novel.

In addition to time-intensity analysis, the present invention performs time-location correlation analysis to characterize events. Time-location correlation is uniquely enabled by the position detection characteristics of the PSD-FPA. When the PSD-FPA is illuminated with a background signal and background subtraction is performed, the resulting signals are very nearly equal. It appears that the PSD-FPA element is illuminated uniformly such that the illumination centroid is exactly in the center of the element. When additional illumination caused by a weapon illuminates the element, this apparent position will shift. This shift occurs for two reasons:

It is extremely unlikely that a signal will align with the exact center of the PSD-FPA element (less than 0.01%). Weapon related signals typically exhibit a position shift. Since the signals exhibit movement, they will not stay aligned with the exact center of the PSD-FPA.

The time-location correlation analysis is used to determine if a real location can be associated with an observed event. If it cannot, then the apparent event is most probably caused by system noise or by a large area background shift, but it is unlikely to be associated with weapons fire or other event of interest. This processing strategy can also be used for any type of sensing with a positional component.

Figure 24:
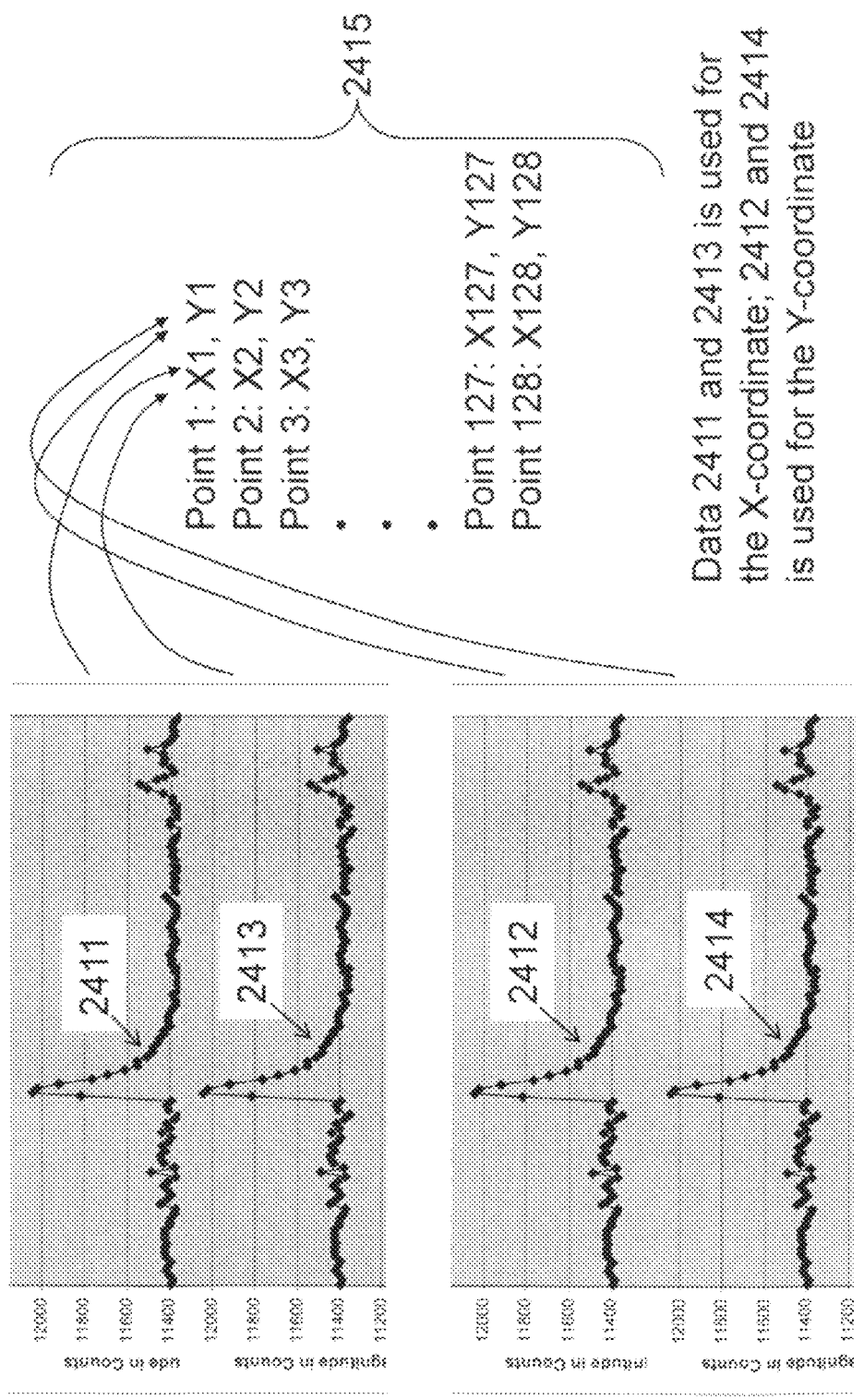
FIG. 24 is an illustration of location calculations for a 128 point data window.
Figure 25:
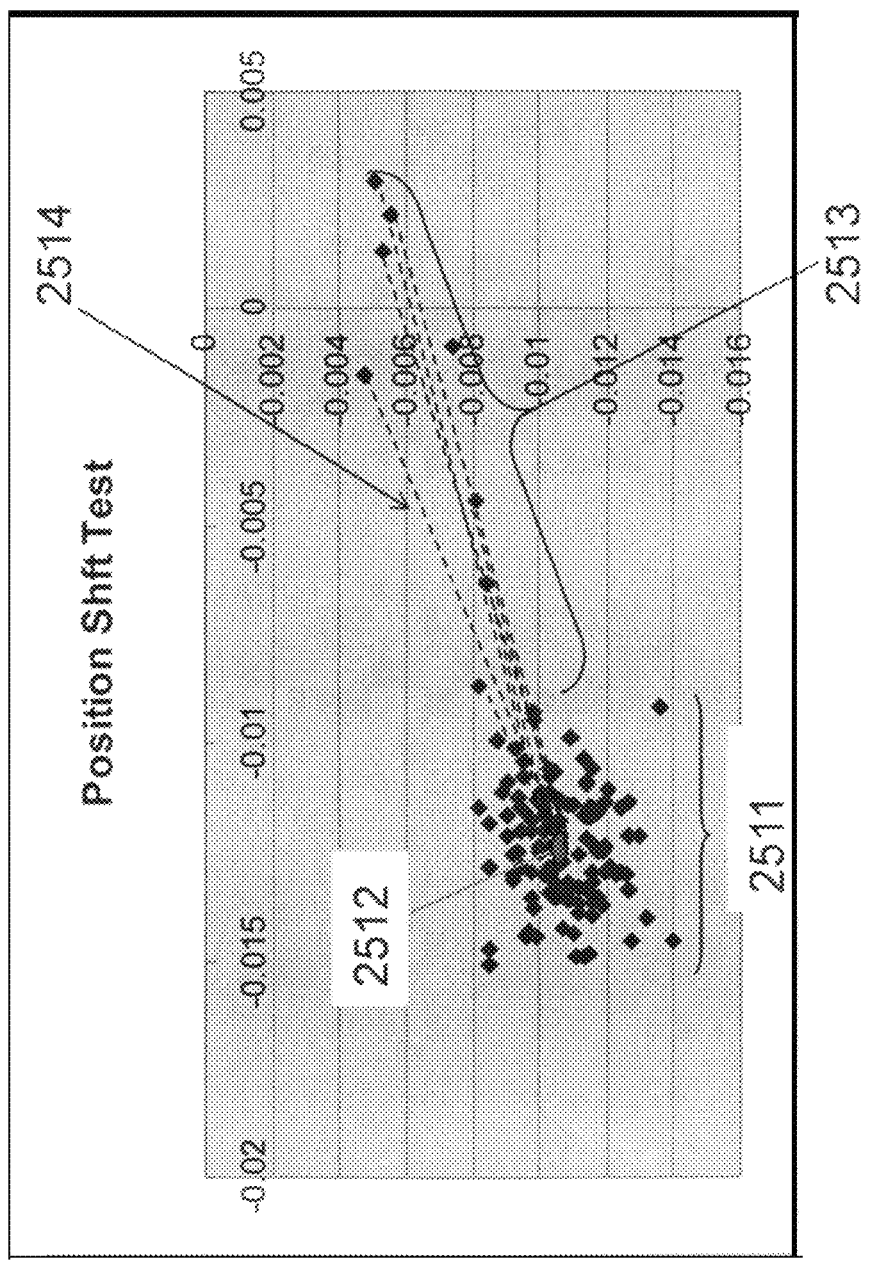
FIG. 25 is a chart showing the characteristics of calculated positions.

FIGS. 24 and 25 illustrate a time-location correlation analysis in the case of a pulse signal. As a first step, the start and end points of a potential signal of interest are determined. This signal processing step is identical to that performed for time-intensity signature analysis, which was shown in FIG. 18. In FIG. 18, the signal start 1813 occurs at point 40, and the signal end point 1815 is point 60. Then as shown in FIG. 20, data from all four signal leads 2411, 2412, 2413, 2414 are used to calculate a position for each location point 2415 in the data window. These calculated positions will exhibit the following characteristics, as shown in FIG. 25:

Points for locations of background signals 2511 prior to the start of the potential signal of interest indicate a location based on the background subtracted signal from the PSD-FPA. Since background subtraction creates a uniform signal across the focal plane, these points will cluster around an average background center point location 2512. Typically, locations points are randomly shifted very slightly off-center due to offsets from individual amplifiers in the PSD-FPA.

Points from an observed event 2513 associated with a signal pulse will show a shift in the calculated centroid position.

Figure 26:
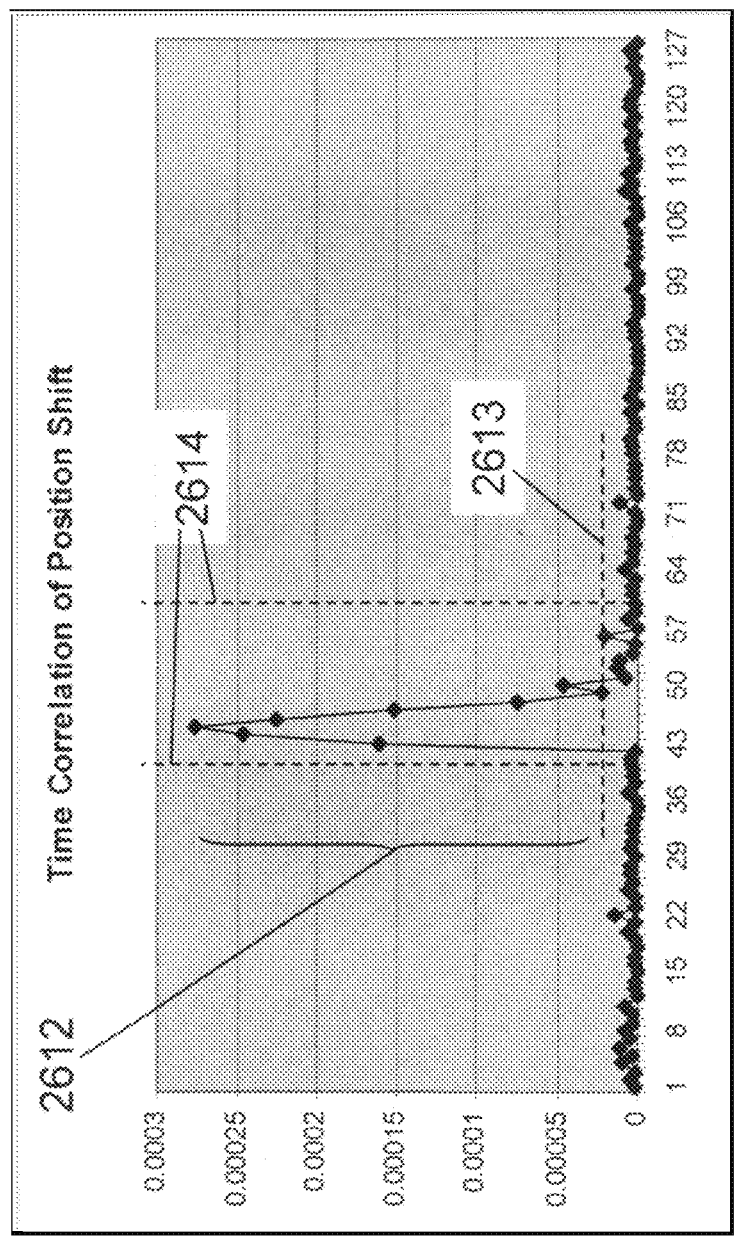
FIG. 26 is a chart showing position shift magnitude.

Once the location of all data points has been calculated, their distances from the average of the background subtracted points 2514 are calculated. As shown in FIG. 26, the magnitude of this relative distance shift 2611 can be plotted on a 2-dimensional chart (time vs. magnitude). If several points in a row, for example 4, 2612 break a minimum location shift threshold 2613 within the pulse time period 2614, as shown, the signal pulse points are considered to be correlated in time with the detected pulse. In this case, the test passes and a real event is indicated. Otherwise, the test fails.

Figure 27:
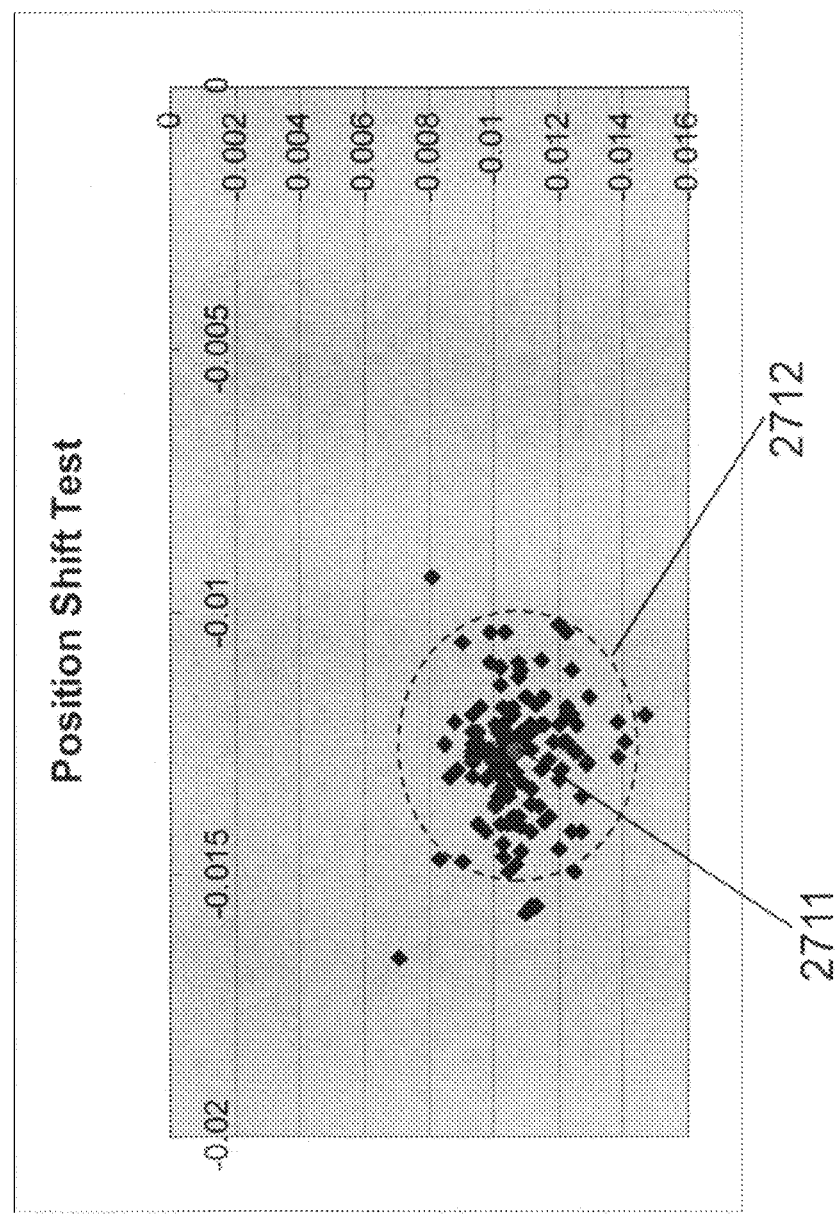
FIG. 27 is a chart illustrating the calculation of the position shift threshold distance.

The present invention autonomously calculates the threshold to determine whether or not a distance shift has occurred. To do this, the system uses background data points from the data window being evaluated that are not part of the signal pulse associated with a potential signal of interest, as shown in FIG. 27. For these points, the system calculates an average location 2711, an average distance deviation from this location, and the standard deviation of this average distance deviation. From these calculations, the present invention determines a distance threshold 2712. For example, for a data window containing 128 signal samples, the following calculations may be performed:

$$X_J = D*(S1_J - S3_J)/(S1_J + S3_J)$$

$$Y_J = D*(S2_J - S4_J)/(S2_J + S4_J)$$

$$X_{AVERAGE} = 1/64 \times (\Sigma_1^{32} X_J + \Sigma_{97}^{128} X_J)$$

$$Y_{AVERAGE} = 1/64 \times (\Sigma_1^{32} Y_J + \Sigma_{97}^{128} Y_J)$$

$$\Delta_J = \sqrt{(X_J - X_{AVERAGE})^2 + (Y_J - Y_{AVERAGE})^2}$$

$$\Delta_{AVERAGE} = 1/64*(\Sigma_1^{32} \Delta_J + \Sigma_{97}^{128} \Delta_J)$$

$$\Delta_{SIGMA} = STDEV(\Delta_J), j=1 \text{ to } 32, 97 \text{ to } 128$$

$$\text{Shift\_threshold} = \Delta_{AVERAGE} K*\Delta_{SIGMA}$$

where S1j, S2j, S3j, and S4j are the jth signal sample from the four signal leads from a PSD-FPA element. D is an arbitrary scaling constant that represents a distance. "STDEV" is the standard deviation function calculated according to the standard definition. K is an arbitrary number, typically between 1.5 and 3.

In the threshold calculation, the data window is formed such that the observed pulse start point 1813 will be near data sample 40. In addition, pulse duration is typically less than 50 data samples. Thus using data samples 1 to 32 and 97 to 128 for the calculation ensures that the distance shift threshold is calculated using only the background signal 31. The choice of the specific data samples and to use is flexible, just as the length of the data window is flexible. Details of these calculations are flexible as well. For example, a suitable delta J can be calculated without using the square root function in order to reduce computational requirements. Similarly, a suitable delta sigma can be calculated using an error-squared function that does not require the square root.

Figure 28:
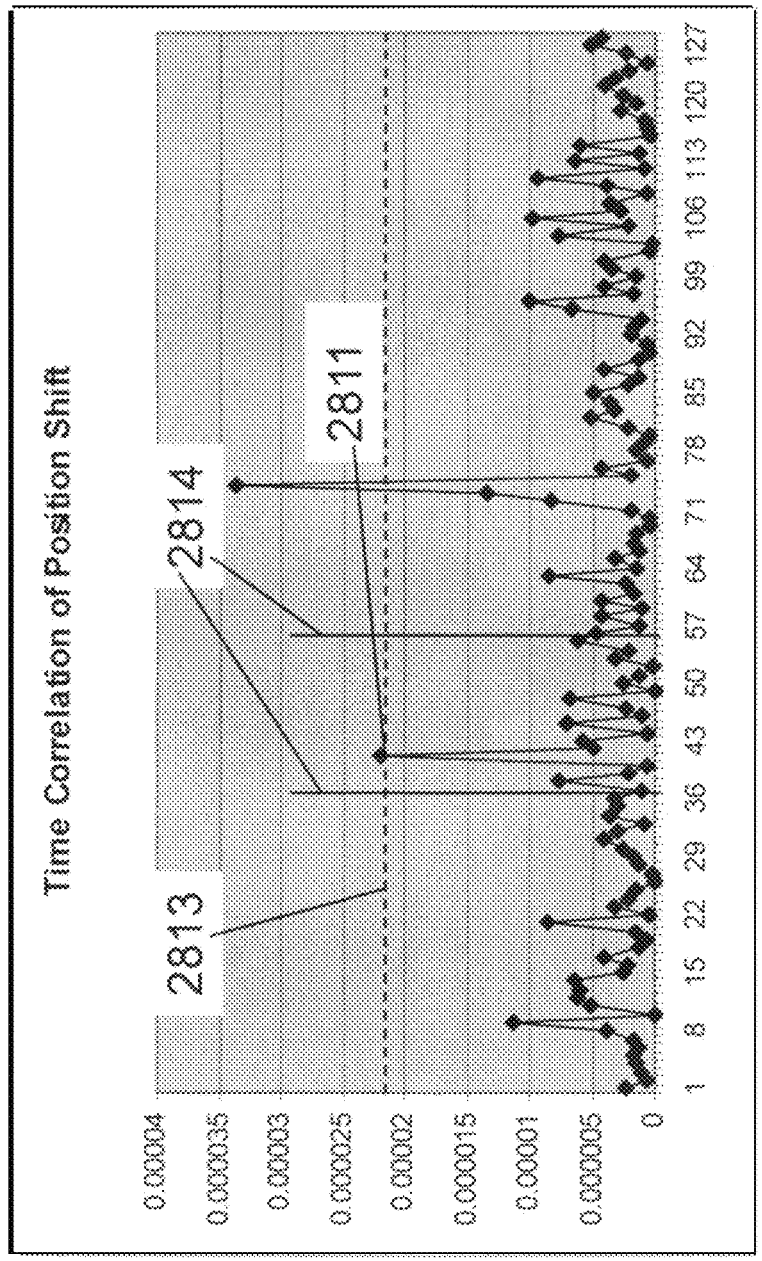
FIG. 28 is a chart showing a false signal position shift.
Figure 29:
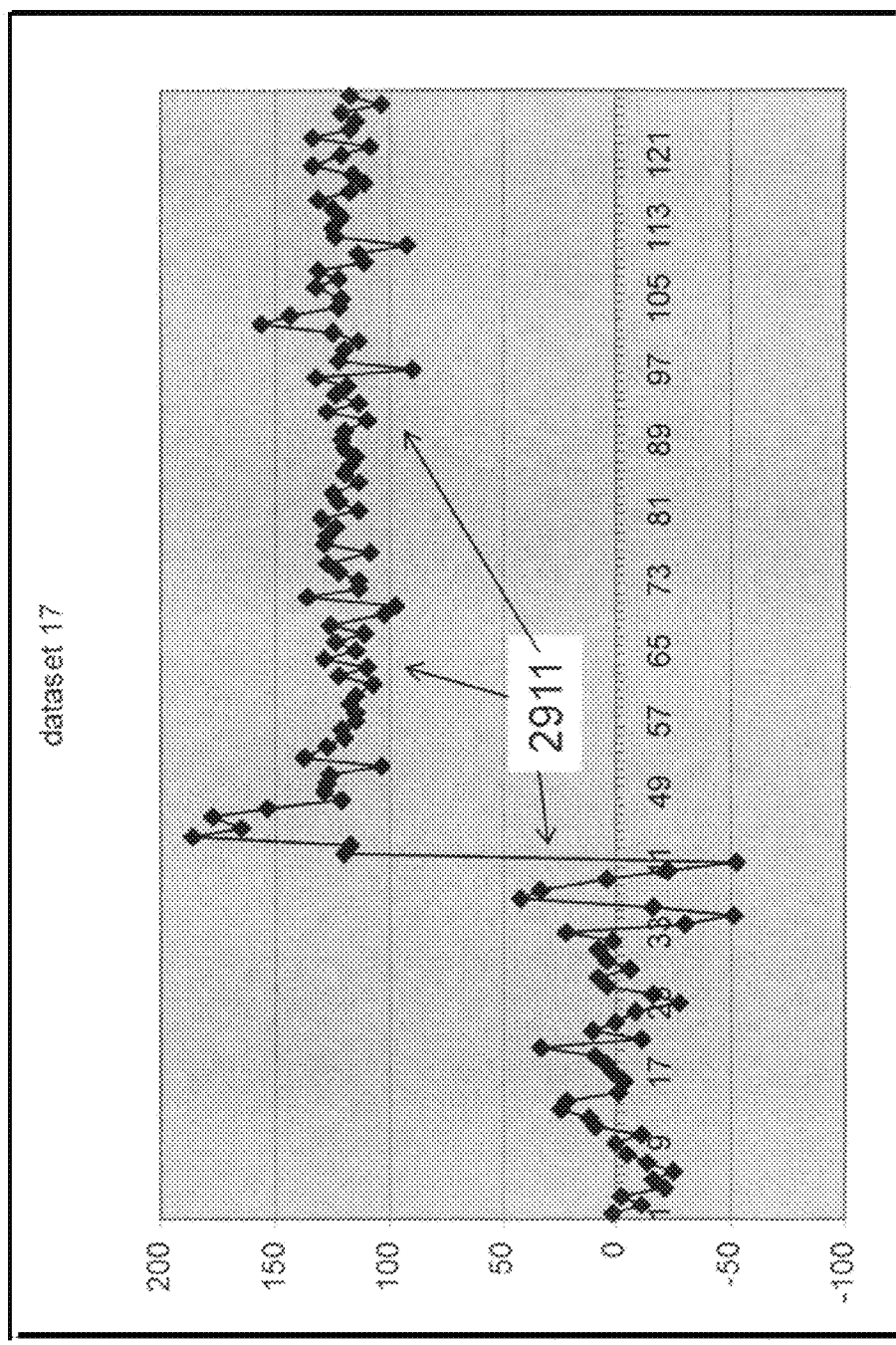
FIG. 29 is a chart showing a non-pulse event.

FIG. 28 shows the time-location correlation chart for a false event. Although one point 2811 within the signal pulse time period 2814 passes the threshold 2813, this is not sufficient. The test fails in this case, and a false event is indicated.

Once time-intensity and time-location correlation tests are complete for pulse testing, the system determines if an observed event is an event of interest, and if so, to what event class it belongs. This function is performed using a weighted decision process that integrates the multiple tests performed using signature analysis and the time-correlation tests. Each test is assigned a weighting factor that determines its relevance for each event type. If a test fails to meet criteria for an event type (for example a certain type of weapon), its weighting factor is added to a cumulative negative score. If the score exceeds a preset threshold, the observed pulse cannot belong to that event class. This procedure can be applied in many applications that are seeking to classify events in categories.

Most weapons fire related events are of short duration and are processed as pulses within a single data window. Non-pulse events 2911, as shown in FIG. 26, may be caused by certain weapons such as missiles or propelled projectiles such as rocket propelled grenades, or they may be caused by other events of interest. To fully characterize these, the system maintains state information. The state information characterizes events that emit a continuous or long duration signal and events with a pulse initiation followed by a continuous or long duration signal.

Figure 30:
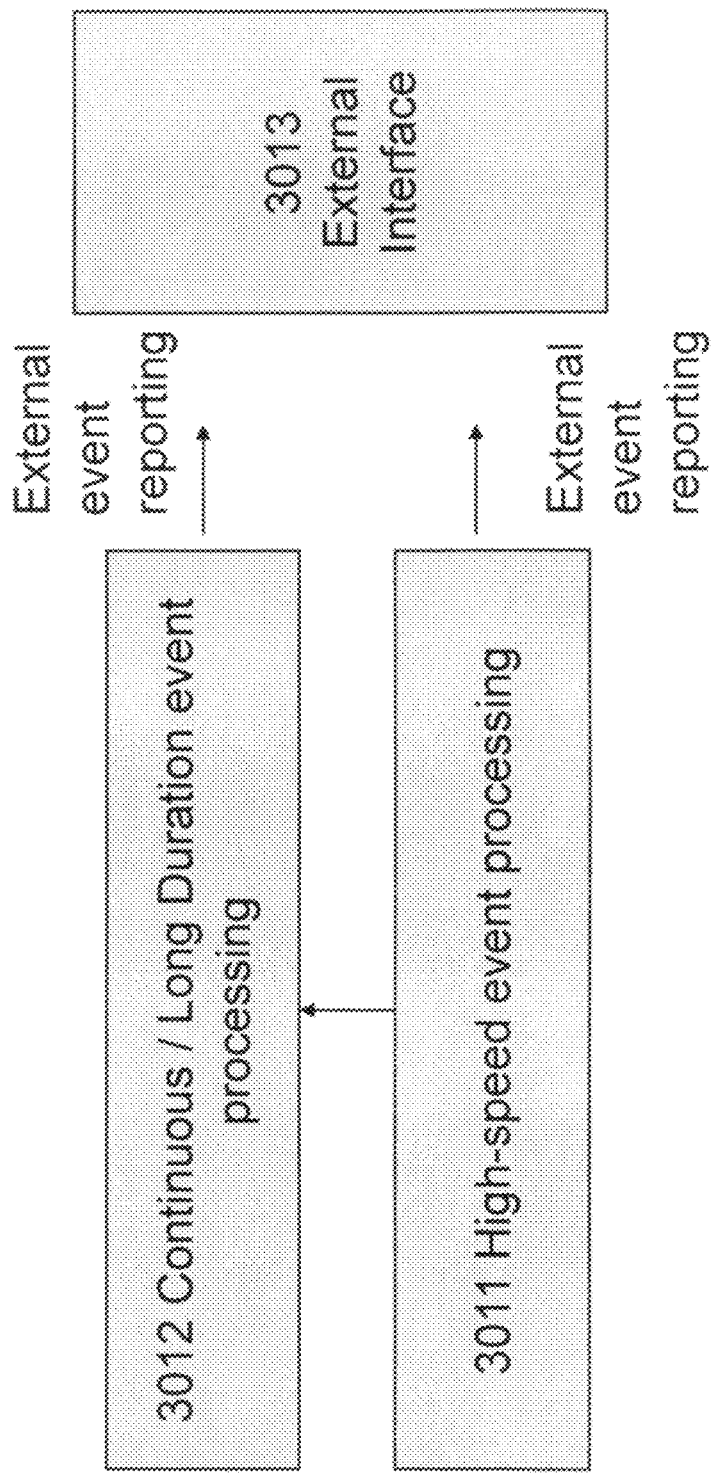
FIG. 30 is a diagram showing the layered processing for long time scale and multi-part events.

To implement this function, the processing model of the present invention is conceptually divided into two layers, as shown in FIG. 30. One layer 3011 is for high-speed event processing. For example, a window is formed and processed every 0.0128 second. The second layer 3012 is for events that may last for several seconds. The high-speed processing layer 3011 processes one data window at a time as described above and in FIGS. 14 through 29. The continuous/long duration layer 3012 maintains state information from layer one. The continuous/long duration layer 3012 stores records of detected events, and uses time and position correlation to determine when a long duration event or a multi-part event has occurred. Both layers 3011 and 3012 report events to an external software (and ultimately hardware) interface 3013.

Figure 31:
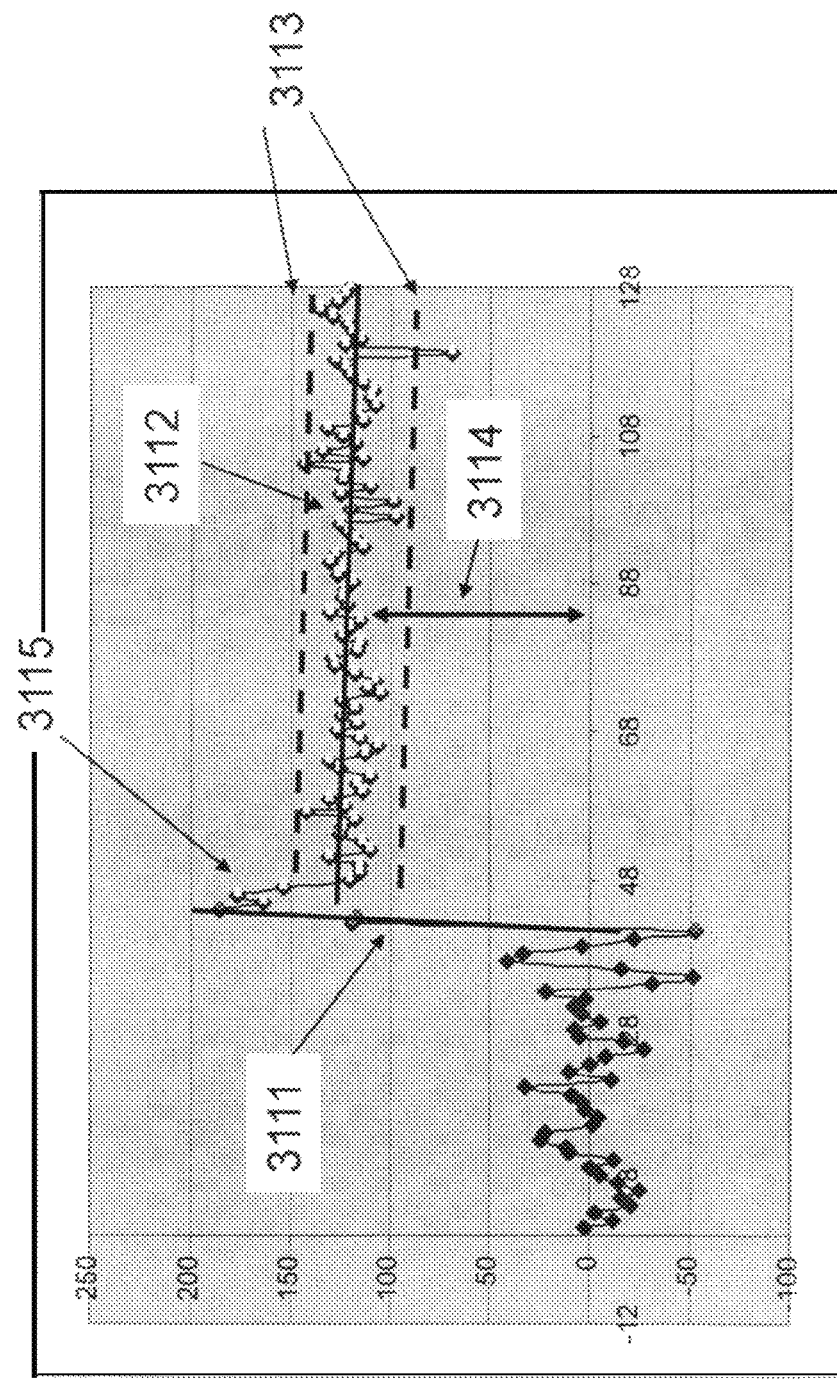
FIG. 31 is an illustration of the time-intensity method applied to long time scale and multi-part events.

Initial fast processing of a continuous event occurs after confirmation of a continuous event rather than a pulse. A continuous signal is processed with the same set of time-intensity signature analysis tests as for a signal pulse, but the specific tests used are different. For example, line fits 3111, 3112 are calculated as in FIG. 31, but instead of comparing slope ratios, the slope parameters are compared against typical values.

For example, for hostile fire detection, the normalized rise slope 3111 (normalized peak signal level of 1) is compared against typical normalized rise slopes for rocket propelled grenades, missiles, tracer rounds, and other weapon classes. The signal level slope 3112 and variation 3113 is compared against values typical for rocket propelled grenades, missile, tracer rounds, and other weapons classes. The absolute brightness level 3114 is compared against typical values for the various weapon classes. The behavior of the observed signal rise that occurs immediately after the peak signal level 3115 is analyzed to determine if the observed rise is consistent with any of the various weapons classes.

A rocket propelled grenade (RPG) is confirmed by a pulse initiation event that matches RPG characteristics followed by a continuous event that changes in intensity and/or moves in angular location. In addition to passing the time-intensity signature analysis and time-location correlation tests from the fast processing layer, these two events must occur within a set time limit in order to confirm the RPG. The continuous/long duration event layer 3012 performs tests to ensure that the time limit is met and that the two events are correlated in location.

For example once the initial flash is detected and classified, the high-speed event processing layer 3011 notifies the continuous/long duration event layer 3012, which sets a state record. The state record includes detected location (azimuth and elevation), the detected time, and the type or potential type(s) of the flash event. In the case of a real RPG, the propelled grenade will ignite 0 to 0.1 (typical) seconds after the initial flash. The high-speed event layer 3011 will determine the location and start time of the signal rise event associated with the propellant ignition and notify the continuous/long duration event processing layer 3012. The continuous/long duration event processing layer 3012 will set a state record that includes the location, time and event type.

Using the recorded state information, the continuous/long duration event processing layer 3012 will then link the two events as one and confirm RPG. This linkage occurs when the event times, types and locations fall within pre-defined bounds. Thus, only event types that could potentially be the individually observed components of a continuous/long duration event are candidates for this linking. Similarly, the events reported to the continuous/long duration processing layer 3012 must occur within a preset time (here 0.1 seconds for example), and within a preset location range, here 5 degrees, for example.

A missile or rocket is confirmed by a continuous event that changes in intensity and/or moves in angular location. The continuous/long duration layer 3012 calculates tracking data in two dimensions for missiles. This tracking information consists of a set of azimuth and elevation angles calculated at flexible time intervals, for example every 0.01 seconds.

Novel aspects of the present invention include:

1. An optical system for weapons (or other event) detection using a position sensing detector focal plane array and consisting of a lens sub-system, position sensing detector focal plane array (PSD-FPA), control and interface electronics, digital computer, and digital signal processing software 2. The optical system of 1 where the lens system is flexibly designed to include 1 or more lenses and light splitting or directing elements 3. The optical system of 1 where multiple PSD-FPA elements are used 4. The optical system of 3 where the multiple PSD-FPA elements are used for dual spectral band sensing 5. The optical system of 4 where the dual spectral band sensing is used to detect the temperature of an observed object or event 6. The optical system of 3 where one PSD-FPA elements is used for passive sensing and the other used for laser illuminated sensing 7. Background subtraction implemented as a programmable current source located prior to the input of the first amplifier in the read out integrated circuit (ROIC) signal chain to realize spatially independent background subtraction 8. Adjustment of background current subtraction on the focal plane by comparison with a comparator located after the first stage of amplification 9. The background current subtraction of 8 with the use of an adjustable reference voltage to establish a controlled uniform background light level, which in turn establishes controllable contrast levels 10. The use of 7,8,9 to enable background clutter rejection 11. Dynamic background subtraction performed at a set frequency to mitigate signals that change more slowly than the background subtraction frequency 12. 10 and 11 to enable background subtraction in moving or dynamic environments 13. Dynamic background subtraction performed whenever the observed scene changes by a preset amount to ensure that contrast levels remain within a specified range 14. Dual gain, fast switchover function to prevent saturation from extremely bright events 15. The switchover function of 14 implemented with a comparator circuit at the output of the CTIA 16. Use of time-intensity windows for optical signal processing 17. 16 where the windows can be of any convenient length 18. 16 where two or more windows can be used simultaneously for multiple processing 19. Spatial and temporally independent detection thresholds calculated by using the average signal variation within a single time-intensity window 20. Use of 19 to discard windows with no signal of interest with minimal signal processing 21. (Time-intensity signature analysis) Event detection by the analysis of time intensity optical waveforms where a model function that represents the intrinsic waveform shape for some type or class of event is optimally matched to the observed data using estimation methods for the parameters of the model function, and if the modeled data points produced from the model function match the actual data with suitable fidelity, an event of that class is deemed to have occurred.

22. (Time-intensity analysis) Event detection by the analysis of time intensity optical waveforms by combining digital filtering, Fourier analysis, wavelet analysis, correlation and the analysis of 21 to extract parameters and error metrics which are tested to classify signals and reduce false alarms.

23. Time-intensity signature analysis of 21 using the specific function pair $F(J)=K*J*\exp(1-L*J)$ and $X_j$, TRANSFORM=$\text{Ln}[X_j/J]$ to categorize guns and weapons producing muzzle blasts according to the value of the parameter L.

24. Use of multiple examples of 21 to classify observed events into one of multiple classes 25. Autonomous calculation of a position shift threshold by calculating average position, average deviation, and standard deviation for a set of samples 26. Time-location correlation analysis, utilizing the technique of 25, to determine if a real and discrete position can be associated with an observed event so as to reduce false alarms These and further and other objects and features of the invention are apparent in the disclosure, which includes the above and ongoing written specification, with the drawings.

We claim:

1. An optical event detection system, comprising
an optical sensor module and
an electronic control module electrically connected to the optical sensor module,
wherein the optical sensor module comprises an optical lens sub-system, wherein the optical lens sub-system has a lens, one or more optical sensors having focal plane arrays comprising one or more position sensing detector focal plane arrays (PSD-FPA), and electronics; and wherein each of the one or more PSD-FPA include detector elements that are lateral effect diode elements, wherein each detector element is comprised of a sensing surface and four signal sensing connections.

2. The system of claim 1, wherein each of the one or more PSD-FPA further comprise a read-out integrated circuit (ROIC).

3. The system of claim 2, wherein the one or more optical sensors further comprises an imaging focal plane array.

4. The system of claim 2, wherein the one or more PSD-FPA further comprises more than one PSD-FPA.

5. The system of claim 2, wherein the electronic control module further comprises human and machine interfaces and a computer and software for system control and system interfaces.

6. The system of claim 5, further comprising interconnect cabling, wherein the optical sensor module further comprises a control and input/output (I/O) component and the electronic control module further comprises an I/O interface, wherein the control and I/O component and I/O interface communicated via the interconnect cabling, and wherein the computer is a signal processing and control computer.

7. The system of claim 6, wherein the optical lens sub-system further comprises one or more minors or light split elements.

8. The system of claim 6, wherein the detector elements of the one or more PSD-FPA comprise a number of lateral effect diode elements, each comprising a sensing surface and four signal sensing connections, wherein each sensing surface comprises a P-N diode structure with a covering of resistive P-layer and illumination photons interact with the sensing surface to generate charges that move through the resistive layer to the signal sensing connections, which connect to the ROIC using indium bump interconnects.

9. The system of claim 8, wherein the ROIC comprises a controllable current source prior to an amplifier corresponding to each signal sensing connection, wherein the controllable current source performs background subtraction by removing a portion of the signals generated from the lateral effect diode elements before they reach the corresponding amplifier.

10. The system of claim 9, wherein the ROIC further comprises a comparator located at the output of each amplifier for adjusting the background subtraction by comparison.

11. The system of claim 10, wherein the comparator comprises an adjustable reference voltage used to establish a controlled uniform background light level, which in turn established controllable contrast levels.

12. The system of claim 10, wherein the ROIC further comprises a variable capacitor across each amplifier controlled by a gain control logic, a sample and hold capacitor that stores the resulting output and is connected dynamically to the amplifier using a sample and hold switch, and an output multiplexer, which allow for variable gain.

13. The system of claim 12, wherein the optical lens sub-system further comprises one or more minors or light split elements, wherein the control and I/O component further comprises a memory buffer for storing output signals from the ROIC, an electronic data-to-electronic control module interface for sending data to the electronic control module when the memory buffer is full, and a low noise level shifting and voltage generator for generating precision control clocks/voltages for the ROIC, further comprising data frames organized by the I/O interface of the electronic control module from data received from the optical sensor module and data windows formed from stacks of the data frames, wherein each data window contains signals from a single element of the one or more PSD-FPA organized in time sequence.

14. The system of claim 6, wherein the control and I/O component further comprises a memory buffer for storing output signals from the ROIC, an electronic data-to-electronic control module interface for sending data to the electronic control module when the memory buffer is full, and a low noise level shifting and voltage generator for generating precision control clocks/voltages for the ROIC.

15. The system of claim 6, further comprising data frames organized by the I/O interface of the electronic control module from data received from the optical sensor module and data windows formed from stacks of the data frames, wherein each data window contains signals from a single element of the one or more PSD-FPA organized in time sequence.

16. An optical event detection and classification method, comprising
providing an optical sensor module comprising one or more position sensing detector focal plane arrays (PSD-FPA), which each comprise a detector and a read out integrated circuit (ROIC), an optical lens sub-system that comprises one or more lenses, and a control and input/output (I/O) component,
providing an electronic control module,
focusing light onto the one or more PSD-FPA with the optical lens sub-system,
sensing photons and generating electrical currents with the detector,
amplifying and sampling the electrical currents with the ROIC,
transmitting the amplified and sampled electrical currents to the control and I/O component,
digitizing and multiplexing the amplified and sampled electrical currents with the control and I/O component,
transmitting the digitized and multiplexed electrical currents to the electronic control module,
receiving the transmitted electrical currents in the electronic control module, and
interpreting the received electrical currents to detect and characterize events.

17. The method of claim 16, wherein the one or more PSD-FPA comprises more than one PSD-FPA, further comprising multiple spectral band sensing using the multiple PSD-FPA.

18. The method of claim 17, further comprising detecting the temperature of an observed object or event using the multiple spectral band sensing.

19. The method of claim 17, further comprising generating control signals with the computer, transmitting the control signals back to the optical sensor module via the I/O interface, receiving the control signals with the control and I/O component, and generating timing pulses and voltages with the control and I/O component to control the PSD-FPA.

20. The method of claim 19, wherein the control and I/O component comprises a memory buffer, data-to-electronic control module interface, and low noise level shifting and voltage generator, wherein the digitizing and multiplexing the amplified and sampled electrical currents with the control and I/O component comprises performing analog-to-digital conversion on the amplified and sampled electrical currents and storing digitized data samples in the memory buffer, wherein the transmitting the digitized and multiplexed electrical currents to the electronic control module comprises sending digitized data samples in the memory buffer to the electronic control module via the data-to-electronic control module interface using a common electrical format when the memory buffer is full, and wherein the generating timing pulses and voltages with the control and I/O component to control the PSD-FPA comprises using received control signals to generate timing and commands and using the low noise level shifting and voltage generator to generate precision control clocks or voltages for the ROIC.

21. The method of claim 19, wherein the receiving the transmitted electrical currents with the I/O interface comprises organizing the transmitted electrical currents into rows and frames of data and the interpreting the received electrical currents carried out in the computer comprises stacking the frames of data to form data windows, each containing signals from a single PSD-FPA diode element organized in time sequence.

22. The method of claim 21, wherein the interpreting the received electrical currents in the computer further comprises multiple processing of two or more data windows simultaneously.

23. The method of claim 22, wherein the interpreting the received electrical currents in the computer further comprises shifting data in a data windows that was not discarded so that the average background value is zero, forming a zeroed signal, determining the start point of a signal rise or pulse that exceeds the event detection threshold, the maximum point of that signal rise or pulse, and the end point of that rise or pulse, if any, using the start point, maximum point, and end point to determine if the signal rise or pulse is a signal rise or a signal pulse, and processing signal rises and signal pulses separately.

24. The method of claim 23, wherein the processing signal pulses comprises calculating line fit equations for the rising and falling edge of each signal pulse as defined by the start point, maximum point, and end point of the pulse and comparing the ratio of the rising and falling slope of each pulse to determine if it falls within the range typical for any of various types of optical events and determining the error between the lines defined by the line fit equations and the actual data.

25. The method of claim 23, wherein the processing signal pulses further comprises performing a time-location correlation analysis to determine if a real location can be associated with an observed event, in the absence of which the source of the observed event is unlikely to be weapons fire.

26. The method of claim 24, wherein the processing signal pulses further comprises fitting two non-linear functions to each signal pulse, determining parameters of the functions, comparing the parameters of the functions to the parameters typical of various types of optical events, and calculating an error metric for each non-linear function measuring how much the actual data deviates from the curve defined by the fit non-linear function.

27. The method of claim 26, wherein the non-linear functions have the form $F(J)=K*J*\exp(1-L*J)$, where J is the time index for the function and is zero for the start point of the signal pulse, and L and K are estimated parameters, and $Xj$, $TRANSFORM=Ln[Xj/J]$ is the transform function used for $F(J)$, wherein only the points from the maximum point of a pulse to the end point are used to estimate the $F(J)$ parameters K and L, where L can be used to categorize weapons producing muzzle blasts.

28. The method of claim 26, wherein the processing signal pulses further comprises digitally filtering window data and using filter responses and ratios as parameters for comparison and testing, conducting Fourier analysis of window data and using Fourier coefficients and frequency power components and ratios as parameters for comparison and testing, and conducting wavelet analysis of windows data using function parameters, their ratios, and error metrics as parameters for comparison and testing.

29. The method of claim 21, wherein the interpreting the received electrical currents in the computer further comprises autonomously determining an event detection threshold for a data window based on signal variation within that data window and discarding the data window if it does not contain a signal rise or pulse that exceeds the event detection threshold.

30. The method of claim 29, wherein the processing signal rises comprises initial fast processing, maintaining state information, storing records of detected signal rises, and using time and position correlation to determine when a long duration event or a multi-part event has occurred.

31. The method of claim 30, wherein the initial fast processing comprises calculating line fit equations for the signal rise and comparing slope parameters against typical values for weapons-related events and fitting non-linear function to the signal rise.

32. The method of claim 30, wherein the interpreting the received electrical currents in the computer further comprises confirming a rocket propelled grenade by identifying a signal pulse initiation event matching RPG characteristics, followed by a continuous event that changes in intensity or moves in angular location occurring within a set time limit, wherein the processing signal rises further comprises testing to ensure that the pulse initiation event and continuous event occur within the set time limit and are correlated in location.

33. The method of claim 30, wherein the processing signal rises further comprises tracking data in two dimensions to confirm a missile or rocket by identifying a continuous event that changes in intensity or moves in angular location.

34. The method of claim 28, wherein the processing signal pulses further comprises performing a time-location correlation analysis and determining if a signal pulse is event-related and if so what class of event it is related to, using a weighted decision process that integrates each analysis and test performed, wherein each test or analysis is assigned a weighting factor that determines its relevance for each event type.

35. The method of claim 28, wherein the processing signal pulses further comprises performing a time-location correlation analysis and determining if a signal pulse is weapons-related and if so what class of weapon it is related to, using a weighted decision process that integrates each analysis and test performed, wherein each test or analysis is assigned a weighting factor that determines its relevance for each weapon type.

36. The method of claim 25, wherein the performing a time-location correlation analysis comprises determining the start and end points of a signal pulse in a data window and using data from all signal leads to calculate a position for each point in the data window, determining an average background center point location, calculating the distance of each point in the data window from the average background center point location, determining a minimum location shift threshold based on the average background center point location, an average distance deviation from the average background center point location, and a standard deviation of this average distance deviation, and determining whether several points in a row break the minimum location shift threshold.

37. The method of claim 16, wherein the one or more PSD-FPA comprises more than one PSD-FPA, further comprising using one PSD-FPA for passive sensing and the other for laser illuminated sensing.

38. The method of claim 16, wherein the electronic control module comprises an I/O interface and a computer, wherein the receiving the transmitted electrical current in the electronic control module comprises receiving the transmitted electrical currents with the I/O interface, further comprising sending the received electrical currents to the computer, wherein the interpreting the received electrical currents is carried out in the computer.

39. The method of claim 16, further comprising operating the one or more PSD-FPA at data rates of 9,000 to 12,000 frames per second.

40. The method of claim 16, wherein the providing an optical sensor module further comprises configuring the optical lens sub-system into a desired arrangement including one or more mirrors or light split elements in addition to the one or more lenses.

41. The method of claim 16, wherein the detector comprises an array of lateral effect diode elements, each of which has signal leads that connect to the ROIC, wherein the sensing photons and generating electrical currents with the detector comprises generating charges from interaction of photons with the detector material that move through a resistive layer to the signal leads, so that the charges are split between the signal leads according to the resistance encountered, which varies according to the distance between the incident photons giving rise to the charges and each signal lead.

42. The method of claim 41, further comprising performing background subtraction on the electrical currents to remove background clutter.

43. The method of claim 42, wherein the performing the background subtraction comprises performing background subtraction separately and independently for each diode element and for each signal lead on the PSD-FPA by connecting each signal lead to a controllable current source prior to the input of an amplifier in the ROIC and removing a portion of the electrical current from the detector with the controllable current source before it reaches the amplifier.

44. The method of claim 43, further comprising performing background calibration.

45. The method of claim 44, further comprising performing background calibration at a set frequency, to implement dynamic background subtraction and mitigate signals that change more slowly than the background calibration frequency, or based on observed background changes, to ensure that contrast levels remain within a specified range.

46. The method of claim 43, wherein the ROIC further comprises an adjustable comparison reference voltage in a comparator at the output of each amplifier, a compare bit and comparator output switch, and a current source control logic, wherein the performing the background subtraction further comprises performing background calibration by comparing the output voltage of each amplifier with the adjustable comparison reference voltage in the comparator and sending a compare bit value to the current source control logic that sets the value of the controllable current source, wherein the compare bit output is connected to the control logic by the comparator output switch, which is closed, forming the connection only when background calibration is commanded.

47. The method of claim 43, wherein the ROIC further comprises a variable capacitor across each amplifier controlled by gain control logic, further comprising controlling the gain control logic directly with the control and I/O component and indirectly with the electronic control module in order to vary the gain of the electrical currents.

48. The method of claim 47, further comprising implementing a dual-gain, fast switchover tripwire function that changes the gain of an individual PSD-FPA diode element from high to low within a single frame read time when the output of the amplifier rises towards a saturation voltage to prevent saturation from extremely bright events.

49. The method of claim 48, wherein the ROIC further comprises an adjustable comparison reference voltage in a comparator at the output of each amplifier, a compare bit and comparator output switch, and a current source control logic, wherein the performing the background subtraction further comprises performing background calibration by comparing the output voltage of each amplifier with the adjustable comparison reference voltage in the comparator and sending a compare bit value to the current source control logic that sets the value of the controllable current source, wherein the compare bit output is connected to the control logic by the comparator output switch, which is closed, forming the connection only when background calibration is commanded, wherein implementing the dual-gain, fast switchover tripwire function comprises setting the adjustable comparison reference voltage to a tripwire voltage when background calibration is not necessary and sending the compare bit to the current source control logic, which sets all four ROIC circuits for a single PSD-FPA diode element to a tripwire gain setting depending on the compare bit.

50. A method of signal processing for detecting events of interest, comprising
   receiving data from a sensor with one or more sensor elements,
   organizing the data into one or more data windows that each contain data from one of the one or more sensor elements organized in time sequence,
   calculating an average sample-to-sample signal change of the data in one of the one or more data windows,
   autonomously determining an event detection threshold for the one data window based on the average sample-to-sample signal change of the data,
   determining whether the one data window contains a pulse or signal rise that exceeds the event detection threshold, and
   discarding the one data window if it does not contain a pulse or signal rise that exceeds the event detection threshold, thereby minimizing the amount of signal processing required.

51. An event detection and classification method, comprising:
   providing one or more sensors, each having one or more sensor elements,
   sensing and generating sensor data with the one or more sensors, and
   processing the sensor data to identify and categorize events of interest,
   wherein the processing the sensor data comprises performing background subtraction, time-intensity and time-location correlation, and wavelet analysis.

52. The method of claim 51, wherein the providing one or more sensors comprises providing one or more position sensing detector focal plane arrays (PSD-FPA), providing an optical lens sub-system that focuses incoming light on the PSD-FPA, wherein the sensing and generating sensor data with the one or more sensors comprises sensing photons and generating electrical signals with the PSD-FPA, wherein the processing the sensor data to identify and categorize events of interest comprises processing the electrical signals to identify and categorize optical events of interest.

53. The method of claim 51, wherein the processing the sensor data further comprises performing Fourier analysis.

54. The method of claim 51, wherein the processing the sensor data further comprises organizing the sensor data into one or more data windows that each contain data from one of the one or more sensor elements organized in time sequence, calculating an average sample-to-sample signal change of the data in one of the one or more data windows, autonomously determining an event detection threshold for the one data window based on the average sample-to-sample signal change of the data, determining whether the one data window contains a pulse or signal rise that exceeds the event detection threshold, and discarding the one data window if it does not contain a pulse or signal rise that exceeds the event detection threshold, thereby minimizing the amount of signal processing required.

* * * * *